United States Patent [19]

Brown

[11] Patent Number: 4,653,009

[45] Date of Patent: Mar. 24, 1987

[54] STAMP DISPENSER

[75] Inventor: Michael A. Brown, Norwalk, Conn.

[73] Assignee: Pitney Bowes Inc., Stamford, Conn.

[21] Appl. No.: 534,222

[22] Filed: Sep. 21, 1983

[51] Int. Cl.[4] ........................ G06F 15/20; G07F 11/00

[52] U.S. Cl. .................................... 364/479; 194/200; 194/217; 221/9; 221/21

[58] Field of Search ............... 364/479, 464, 465, 466; 226/9, 100, 187; 194/1 N, 2, 10, 200, 215-223; 221/9, 21, 7; 235/101

[56] References Cited

U.S. PATENT DOCUMENTS

| | | | |
|---|---|---|---|
| 3,621,964 | 11/1971 | Riddle et al. | 194/10 |
| 3,866,175 | 2/1975 | Seifert, Jr. et al. | 340/825.1 |
| 3,917,142 | 11/1975 | Guarderas | 226/100 X |
| 3,978,958 | 9/1976 | Zandstra | 194/2 |
| 4,040,510 | 8/1977 | Peters et al. | 194/10 X |
| 4,119,161 | 10/1978 | Price et al. | 177/3 |
| 4,225,056 | 9/1980 | Flubacker | 364/479 X |
| 4,272,001 | 6/1981 | Horniak | 226/187 |
| 4,340,150 | 7/1982 | Guibord et al. | 194/1 R X |
| 4,449,186 | 5/1984 | Kelly et al. | 364/401 X |

*Primary Examiner*—Joseph Ruggiero

*Attorney, Agent, or Firm*—Michael J. DeSha; David E. Pitchenik; Melvin J. Scolnick

[57] ABSTRACT

A stamp dispensing apparatus receives and transmits serial data between itself and a central computer. The data from the computer includes stamp dispensing commands as well as supervisory commands in a predetermined serial data format. The stamp dispensing apparatus comprises interface means for receiving the data, decoding the data, and actuating a stamp dispensing mechanism. The apparatus includes an LED-photodetector mechanism for detecting stamp perforations to allow counting of the number of stamps dispensed. Dispensing errors are detected and reported back to the computer.

11 Claims, 11 Drawing Figures

STAMP DISPENSER

BACKGROUND OF THE INVENTION

Figure 1:
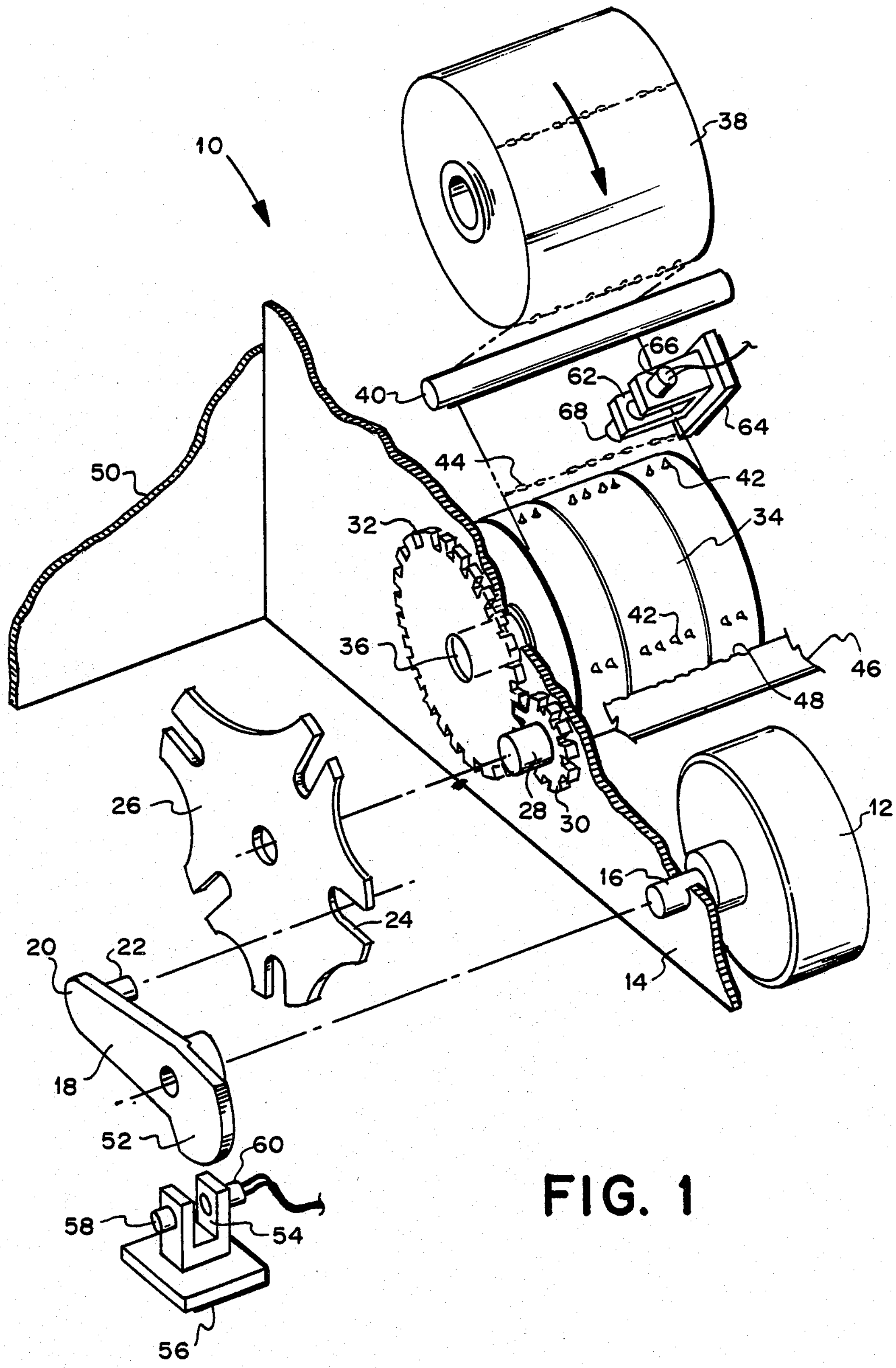

The invention relates to an apparatus for dispensing stamps and more particularly to apparatus for dispensing stamps in response to a serial data transmission from a sender for the dispensing of a selected number of stamps.

There are a number of issued patents for different stamp dispensers for vending stamps. Typical devices are disclosed in U.S. Pat. No. 3,655,109 issued to Stevens, U.S. Pat. No. 3,548,991 issued to Flubacker, and U.S. Pat. No. 4,040,510 issued to Peters, et al. Such devices use a feed wheel or drive roller which is coin-actuated and which rotates for a predetermined number of steps to feed a strip of stamps in step-wise increments through an aperture of the device. The number of stamps dispensed is counted by counting the number of steps of rotation of the wheel by the use of micro-switches or by the use of solenoid latches and a counting wheel. None of these conventional devices is suitable for use in a post office window operation where it is desirable that the dispensing operation be entirely controllable by a computer.

SUMMARY OF THE INVENTION

In accordance with the present invention, an apparatus for vending stamps includes an interface for communication with a sender device, suitably a central computer. The interface receives data in a predetermined serial data format and transmits its status and other predetermined signals in a similar serial data format to the computer for the purposes of accounting and indication of errors in the dispensing function. The interface apparatus decodes the messages from the computer and converts them into actuating signals for actuating the stamp dispensing mechanisms. The numbers of stamps dispensed or any errors in the dispensing operation are detected and subsequently encoded into the predetermined format and sent to the computer.

In an embodiment of the invention, a motor drives a Geneva driver assembly for intermittent step rotation of a stamp feed wheel. For best results, projections on the stamp feed wheel engage the perforations of a strip of stamps being fed from a roll of stamps so as to feed stamps through a dispensing aperture of the device. It will be appreciated that while the disclosed mechanism is preferable, other means for feeding the stamps are known in the art and they may be substituted for the dispensing mechanism if desired.

The Geneva drive assembly preferably comprises a Geneva star wheel having five slots and a driver arm driven by a reduction gear such that for each advance of one step of the Geneva star wheel, the feed wheel advances the strip of stamps a distance of one half stamp width through the dispensing aperture. For best results, the driver arm has affixed thereto an arcuate flange, suitably of 120° of arc, which is disposed so as to interrupt the beam of an LED which normally impinges on a photodetector. This device serves as an encoder of the position of the drive arm and the "light" and "dark" encoding of the position of the driver arm enables precise actuation of the motor in response to actuation signals.

A pivotable lockable arm forms an arcuate guide about the feed wheel to retain the strip in engagement with the feed wheel. Suitably, the driver arm has means for locking the Geneva star wheel from further rotation after the appropriate number of stamps have been dispensed. The projections on the feed wheel in combination with the arcuate guide form a gate which prevent other stamps from being pulled through the dispensing aperture and also as a bar against which the dispensed strip may be torn for removal from the device.

The interface for communicating with the computer for dispensing stamps comprises a Central Processing Unit, a Programmable Read Only memory, and Input/Output device with Random Access Memory, and a Programmable Communication Interface or Universal Synchronous-Asynchronous Receiver Transmitter (USART) all in communication through a suitable address and data bus as is known in the art.

Preferably, the dispensed stamps are counted by the passage of perforations (of the sequential stamps on the strip) between the beam of an LED and a photodetector so that an electrical pulse is created as the normally blocked beam passes through the holes of the perforations. The LED-Photodetector combination also serves as the out-of-stamps detector as the detector remains on when there are no longer stamps to block the beam.

In accordance with the invention, the motor may be driven either in a forward or reverse direction. The control of the motor is preferably by means of an SCR in the line to the appropriate winding of the motor. The SCR is preferably controlled by a conventional optically isolated SCR which is gated on by a signal from the appropriate pin of the output port of the Input/Output device.

For best results, LED's are disposed in known manner for displaying the presence or absence of signals in each of the various lines communicating information to the interface. These are particularly helpful for service in the field. In addition, for diagnostic purposes, the device is equipped with a test button which when, depressed, will command the actuation and test of the motor in each direction to clear a jam.

Suitably, the communication between the central computer and the interface in accordance with the invention uses the conventional RS-232 standards. While the present configuration is appropriate for a 1200 or 2400 band transmission rate, serial asynchronous transmission, it will be appreciated that other rates may be accommodated with appropriate modifications apparent to those skilled in the art.

Other features and objects of the invention will be apparent in conjunction with the description of the drawing wherein:

FIG. 1 is a partially exploded perspective view of a stamp dispensing module;

FIGS. *2a-2e* comprise a circuit diagram of an embodiment of an interface in accordance with the invention; and FIGS. *3a-3c* comprise a flow diagram of the operation of the stamp dispensing device in accordance with the invention.

Figure 4:
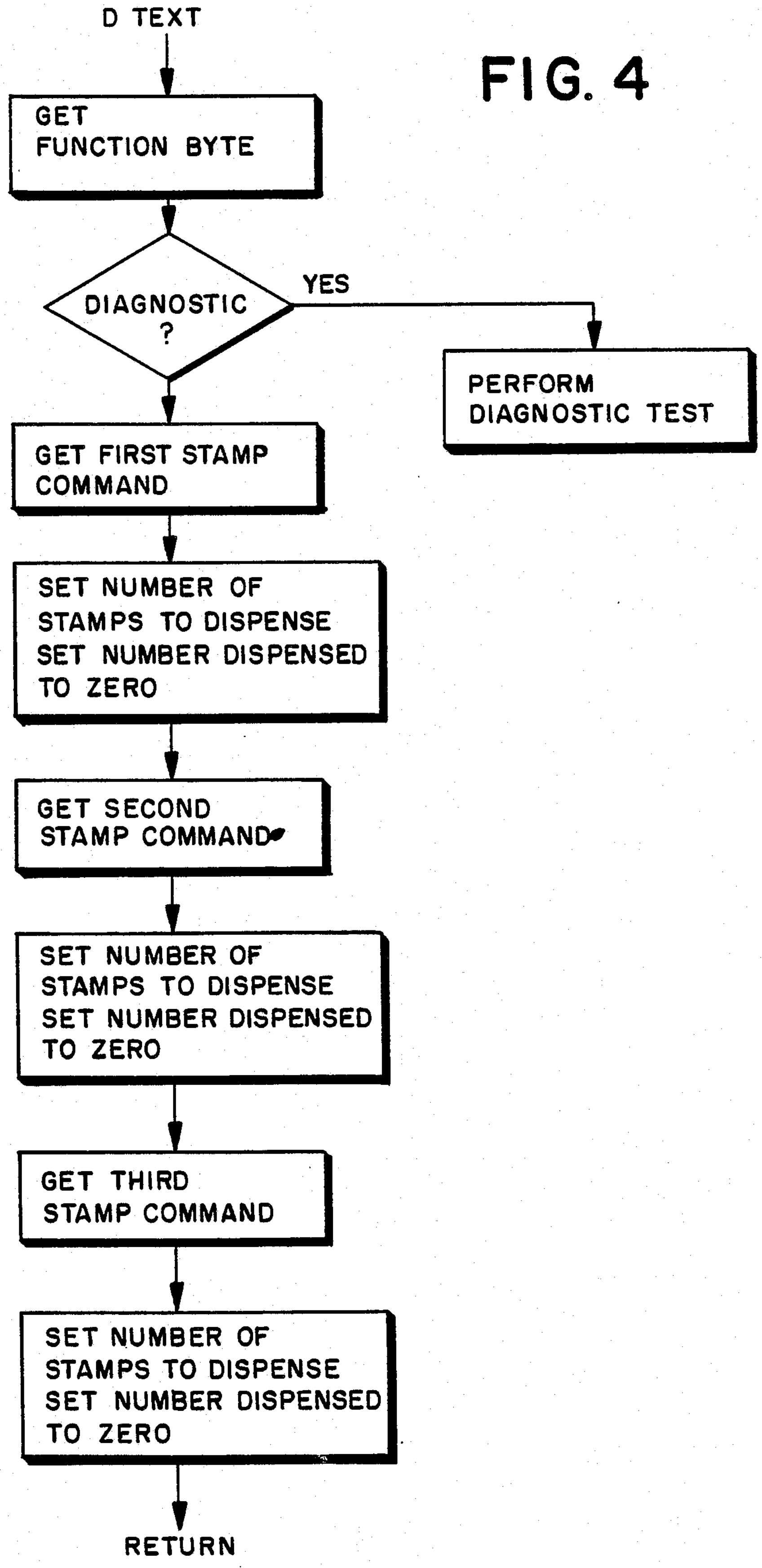

FIG. 4 is a flow chart of a diagnostic test suitable for use with the apparatus of the invention.

FIG. 1 shows at 10 an exploded perspective view of one of preferably, three identical stamp dispensing assemblies. The construction and operation of a similar module is disclosed in U.S. Pat. No. 4,033,494 issued to Middleton, et al. and incorporated herein by reference. Motor 12 is mounted on a interior frame member 14. Motor shaft 16 has a driver arm 18 affixed thereon. The distal end 20 of arm 18 has a pin 22 which, on each revolution of the shaft 16, engages successive slots 24 of Geneva star wheel 26 for step-wise rotation of the Geneva star wheel. Wheel 26 is affixed on shaft 28 which is rotatingly received on frame 14 along with gear 30. Gear 30 in turn engages gear 32 for driving feed wheel 34 to which gear 32 is connected by shaft 36 also rotatably mounted on frame 14.

A roll of stamps 38 is disposed on a spindle (not shown) mounted on the frame and the strip extending therefrom is carried about an idler roller 40 and threaded about the feed wheel 34. Rows of projecting teeth 42 radially protrude from feed wheel 34 and are arranged for engagement with rows of perforations in the stamp strip indicated at 44. For best results, the gear ratio between gear 30 and gear 32 is such that the feed wheel 34 rotates an amount sufficient to advance the stamp strip one half the distance between the rows of perforations for each step rotation of the Geneva star wheel.

A pivotable and lockable guide member, a portion of which is indicated at 46 has grooves 48 which are arranged to receive the corresponding teeth of the feed wheel. The strip of stamps is thus engaged and guided between the feed wheel 34 and the guide member 46 and from there to a dispensing aperture (not shown ) in an outer-enclosure indicated at 50.

In accordance with the invention, the arm 18 has an arcuate flange 52 opposedly extending from the distal end thereof. The flange 52 is disposed so as to extend into a slot 54 in fixture 56 during a portion of the rotation of the arm 18. Preferably, the flange encompasses an arc of approximately 120°, but it will be appreciated that other arc segments might be utilized with appropriate routine modifications.

Fixture 56 has a light emitting diode 58 on one side and phototransistor 60 on opposing sides of the slot 54. It will be understood that other light sources and detectors may also be used in similar manner. The flange 52 interrupts the beam of light from the LED to provide a simple on-off (light-dark) encoding of the position of the driver arm 18.

As disclosed in U.S. Pat. No. 4,033,494, one can use a microswitch assembly to count the number of step rotations of the Geneva star wheel 34; however, for best results, the actual dispensing of stamps must be counted. In accordance with the invention, the strip of stamps leading from the roll of stamps is fed through a slot 62 of fixture 64. At one side of the slot is photodetector 66 which is disposed to receive a beam of light from LED 68 or the opposing side of the slot. The beam of light emanating from the LED thus impinges on the detector only when the perforations 44 allow transmission. The passage of the perforations as the stamps are being transported thus generates an electrical pulse from the photodetector which, as discussed below, enables counting of the number of stamps dispensed. Further, the interrupted beam which occurs when there is no stamp in the slot provides an out-of-stamp signal indication to indicate a ruptured strip or that the end of the roll of stamps has been reached.

An embodiment of the stamp dispensing interface in accordance with the invention is shown generally in the schematic diagram in FIGS. 2*a*–2*e* the operation of the interface is controlled by a Central Processing Unit (CPU) 70, suitably an 8085 8-bit microprocessor available from INTEL and an Input/Output device 74 having a Random Access Memory, suitably a 2048 bit RAM with I/O Ports 8155 available from INTEL.

Communications are received from a sender, such as a central computer (not shown), in a predetermined serial format along with other signals on parallel transmission lines, e.g. 76, 78, 80, respectively, through inverting drivers 82 connected to a programmable communication interface 84, e.g. a Universal Synchronous-Asynchronous Receiver Transmitter, preferably a conventional 8251 Programmable Communication Interface (PCI) available from INTEL. Signals to the central computer from the USART are transmitted along lines 86, 88, 90, respectively, suitably through a plurality of inverting dual-input gates 92.

For best results and for ease of servicing, a plurality of Light Emitting Diodes 94, 96, 98, 100, 101, 102, and 103 are connected in suitable manner through, respective, known resistors and diode networks so as to indicate the presence of signals on each of the individual lines.

Conventionally serial data is transmitted from the PCI 84 along line 90 and received on line 80 at times controlled by signals on the remaining lines as well known in the art. A particular format of serial data used with the instant interface has a message format of from five to 256 data bytes as illustrated in Table I.

TABLE I

| STX | VLI | XCW | [TXT] | ETX | ECC |
|---|---|---|---|---|---|

The message is transmitted in the order listed in Table I and consists of a start of text, STX, byte, suitably 02H and an End of Text byte, ETX, suitably 03H. VLI is a byte representing the total number of bytes in the message.

XCW represents a mandatory word for control of operation. For instance, each bit of this word may be made to represent control functions and status of the last message transferred. Suitably the lowest bit of this byte may indicate the presence of a text and its absence a supervisory control. To assure data integrity, a byte is generated, which suitably is the byte resulting from the "Exclusive OR" of all of the same bit positions in the message.

The TXT portion may contain data or status words or the like. Conveniently these are ASCII encoded bytes from the sender to inform the stamp dispensing device as to the amounts of stamps to be dispensed from the dispensing device. For example, a stamp dispenser order from the central computer to dispense $2.15 worth of stamps from a first roll of $0.20 stamps, a second roll of $0.10 stamps, and a third roll of $0.05 stamps is suitably as shown in Table II.

TABLE II

| STX | VLI | XCW | ESC | FNC | — | Q1 | — | — | Q2 | — | — | Q3 | — | ETX | ECL |
|---|---|---|---|---|---|---|---|---|---|---|---|---|---|---|---|
| 02H | ODH | O1H | 13H | 01H | 30H | 31H | 30H | 30H | 30H | 30H | 30H | 30H | 31H | 03H | 2CH |

The bytes Q1, Q2, Q3 indicate in ASCII characters that 10 stamps are to be dispensed from roll #1, none from roll #2, and 1 stamp from roll #3. FNC is a word of text which is utilized to command the dispensing of the stamps and may be utilized as well to command diagnostic tests. ESC may be utilized as an error word.

It will be appreciated that other words may be included as desired to provide other indications, error flags, or commands. For instance, the interface may send to the computer text bytes identifying errors encountered on the previous dispense orders.

In accordance with the invention, the stamp sensors 104, 105, 106, each of which is as has been previously described in conjunction with FIG. 1 for monitoring the transport of stamps, are connected through inverting drivers 108 to suitable port pins of I/O device 74. Similarly the outputs of each of the "light-dark" encoders 110, 111, 112 are connected respectively to others of the port pins of the I/O device 74.

Preferably, a microswitch 114 is connected so as to open while a cover (not shown) is open for access to the rolls of stamps. Suitable test indications are preferably initiated by the operation of test switch 116, operated conveniently only by service personnel. The signals are preferably fed through inverting drivers 117 to suitable port pins of I/O 74. Again light emitting diodes may be used to sense the presence of the signals.

Motors 12*a*, *12b*, and 12*c* are arranged for each dispensing mechanism as illustrated in FIG. 1 for motor 12. The motors are operable in either a forward or reverse direction in conventional manner by the application of power to the appropriate windings of each motor through SCR's 118, 119, 120, 121, 122, and 123. Preferably the appropriate SCR's are gated in turn by optically isolated switches 124, 126, 128, 130, 132, and 134 driven by signals from port pins in the I/O device 74 through inverting drivers 136. Conveniently, signal indicators such as LED's 138, 140, 142, 144, 146, and 148 are utilized in conventional manner to show the presence of an appropriate signal on for the I/O device.

Preferably an out-of-stamp indication is displayed on LED's 150, 152, and 154 and is set by signals from port pins on the I/O device through inverting drivers 156. Suitably LED's 158, 160, and 162 also indicate the out-of-stamp signal for servicing.

As mentioned previously, data is received at PCI (USART) 84 in serial format. The data is converted to a parallel format and is output therefrom upon receipt of an appropriate signal to communicating bus 164. Addresses and data from the CPU 70 are also communicated to the bus 164. The addresses are latched in known manner by latches at 166, suitably a 74LS373 device available from Signetics. The latched addresses are communicated by appropriate timing signals from the CPU 70 to EPROM 72 along address lines shown generally at 168. Data from the EPROM 72 is then communicated to bus 164 for transmission to the remaining devices. The bus 164 also connects the I/O RAM address data input/output pins to CPU 70.

It will also be appreciated that the presence of +12 v, −12 v, and +5 v are assumed to be available to the interface from a power supply (not shown) and are filtered in known manner by a filter network indicated generally at 170.

Figure 3A:
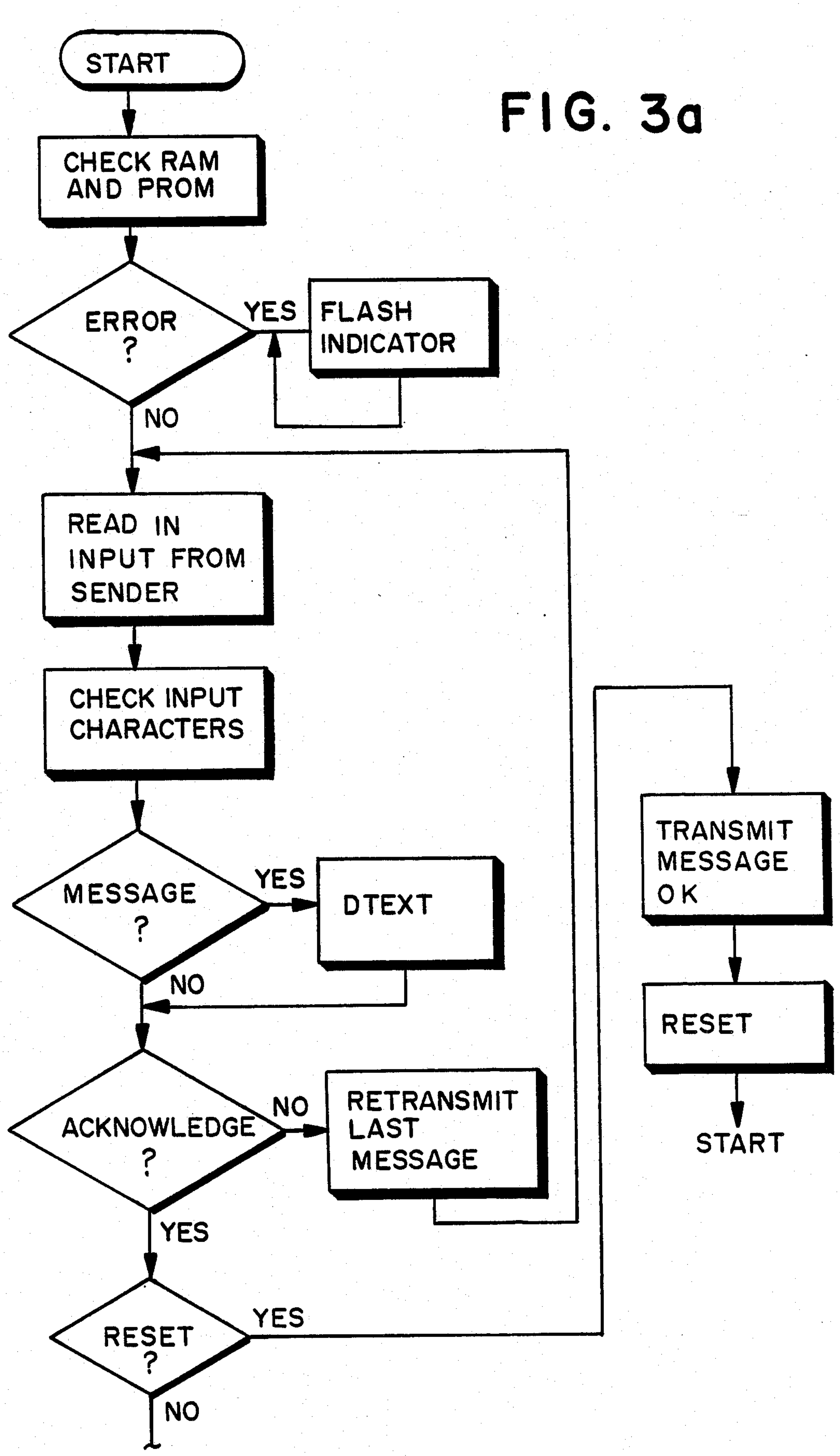
Figure 3B:
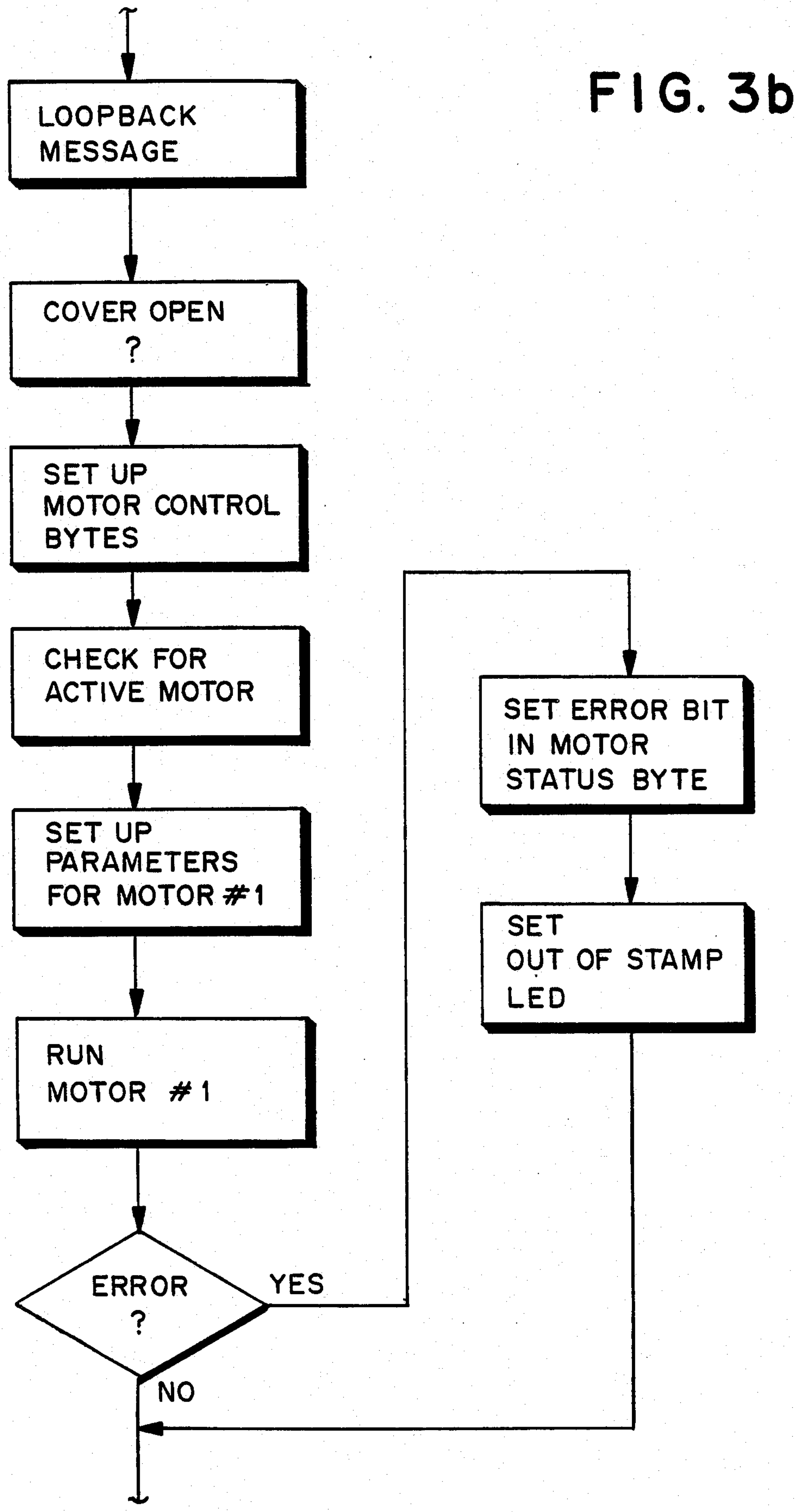
Figure 3C:
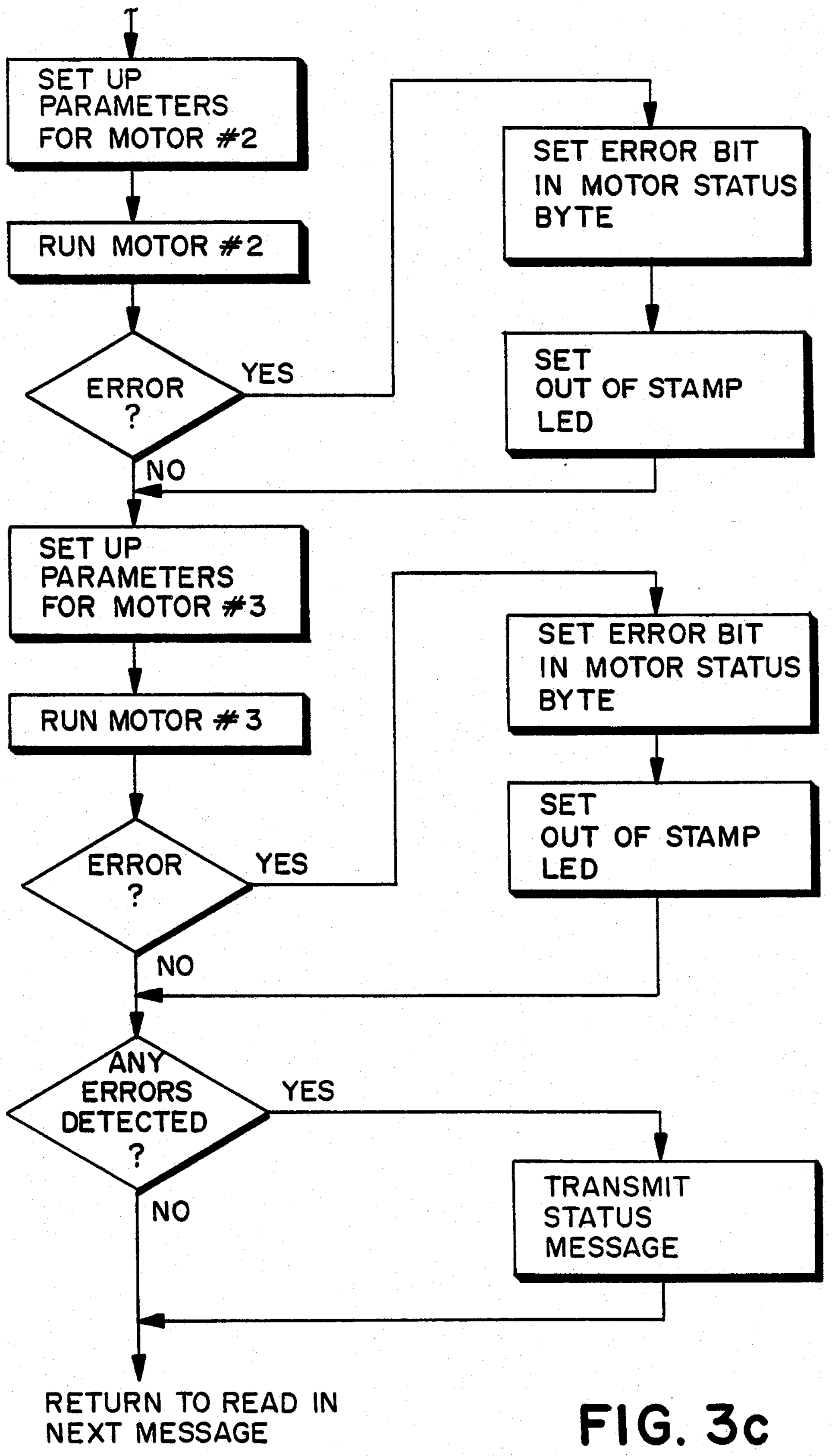

FIGS. 3*a*–3*c* comprise a flow diagram of the operation of the stamp dispenser in accordance with the invention. Upon power up, the CPU proceeds through a routine to check the PROM and RAM. If the RAM checks bad, the test stops and suitably one of the out-of-stamp LED's is made to flash slowly. The program is in a loop and no other operation occurs. If the PROM checks bad, the test stops and the program enters a loop which causes two of the out-of-stamp indicators to flash slowly. In either event, the machine power must be removed in order to exit the error condition. If its memories test OK, no indication is given and the apparatus is ready for normal operation.

It is assumed that the dispenser will process only one message at a time. Acknowledgement of the message will occur after the dispense order or diagnostic exercise is complete and will include an appropriate status message for communication to the central operation if required. The lowest bit of the transfer control word is checked to see if the transmission is a text message. If there is a text, the operation jumps to the DTEXT subroutine to set the number of stamps to dispense. If there is no text or after the text has been decoded, the bits of the transfer word are again examined to see if there was an acknowledgement of the last message transmitted by the dispenser. If the message was not acknowledged, the previous message is again transmitted and the system returns to the beginning of its loop to receive the next transmission.

If the previous message from the dispenser has been acknowledged, the word is further checked to see if there is a reset command. If there is a command to reset, then a message OK status is sent to the central computer and a reset pulse is generated to reset. If there is no reset indication, the received message is then looped back for retransmission if required by the subsequent message from the central computer.

The status of the cover is then checked. If the cover is open, microswitch 108 is open and a cover open signal is present at the part of the I/O 74. If open, a "cover open" status message is sent to the central computer and the program returns to the beginning to await the next transmission without dispensing any stamps. It will be appreciated that this precludes any unauthorized and unaccounted dispensing of stamps.

If the system is operative to this point, the motor control functions are initiated. The dispensing parameters are set up for motor #1, the motor is operated by control of the corresponding SCR until either the required number of stamps are dispensed or until an error is encountered in the dispensing operation. Suitably, if an error is encountered, an appropriately coded byte is configured for transmission in the status message to the central computer. Conveniently, the Out-of-Stamps LED for Roll #1 of the dispenser is also lit to provide a visual indication of a dispensing error.

Preferably, the interface sets the parameters for the second motor and runs the motor until the required stamps have been dispensed and then the 3rd motor is sequenced; but it will be appreciated that the three motors could be operated substantially simultaneously if desired.

If no errors are encountered in the dispensing, the interface is again ready to receive the next message from the central computer. Otherwise, the status of the dispenser is formed as a word and is transmitted to the computer upon indication that the computer is ready to receive the message.

The DTEXT subroutine illustrated in FIG. 4 examines each of the words in the text portion of the message. The Function byte of the Text portion of the message is first examined to see whether a Diagnostic Test has been commanded by the computer. If the Diagnostics are required the routine jumps to the diagnostic subroutine. If no test is commanded, the interface proceeds with the decoding and storing of the numbers of stamps to be dispensed from each roll. For each roll, the data is initialized by setting the number of dispensed stamps to zero. Thus at the end of this subroutine, the dispenser has data corresponding to the number of stamps to be dispensed and an initial setting for the number of stamps dispensed.

The operation of the dispenser will now be described. Assuming that the central computer sends the command illustrated in Table II, the interface in accordance with the invention receives and stores the message bytes. The control word is checked to see if the message includes TEXT bytes. Since in this case it does, the TEXT is then decoded. The function bytes is checked. In this example, there is no requirement for a diagnostic test and the remaining byte words are checked. Thus the one hundreds, tens, and digit bytes are decoded and summed for each motor. Thereafter, for motor #1, the number of stamps to be dispensed from the roll is set at ten, the number for the second motor is zero, and the number the 3rd motor is to dispense is set to one. For each motor the number of stamps dispensed is set to zero.

Again assuming no errors and that the cover remains closed, the motor control bytes are set up and the dispenser begins to dispense stamps. The encoder positioning of each motor in the home position is arranged such that it provides a "dark" signal. The motor is actuated by providing the appropriate signal to gate SCR 118 for driving the motor 12*a* in the forward direction. Preferably each full revolution of the motor dispenses or transports ½ a stamp. Thus the encoder goes through 4 transitions to dispense one stamp, i.e. dark to light, light to dark, dark to light, and finally light to dark. Each phase (or half revolution) has a corresponding time interval for its normal occurrence.

Referring again to FIG. 1, it is seen that for each revolution of the motor 12 (12*a* in this instance), the pin 22 in arm 18 engages a corresponding slot 24 of the wheel 26. As the arm revolves the pin in the slot drives the wheel 26 until the pin again leaves the slot. Preferably, as illustrated in FIG. 1, the arcuate portion of the arm near the shaft projects into a corresponding arcuate recess in the circumference of the wheel 26 to lock the wheel from further rotation. At then end of the dispensing cycle then, the projections 42 of feed wheel 34 extending into grooves 48 form a gate or barrier against which the stamps may be torn and the above described locking feature prevents any further stamps from being dispensed by pulling on the previously dispensed strip of stamps.

At appropriate time intervals, is is also expected that the stamp sensor 104 will provide the appropriate pulse indication of the passage of a row of perforations which will indicate the dispensing of each stamp. So long as each of these indications occur at the proper interval, the signal to SCR 118 is provided and motor #1 continues to run until the number of stamps dispensed matches the number required to be dispensed. In this example 10 stamps are dispensed and the routine proceeds to Motor #2 which in this case is not required to dispense stamps.

If a timeout signal occurred during the dispensing interval, a stamp or motor jam would be assumed and an appropriate error byte generated for transmission to the central computer, and the Out-of-Stamp LED will be lit for out of stamp conditions.

Figure 2:
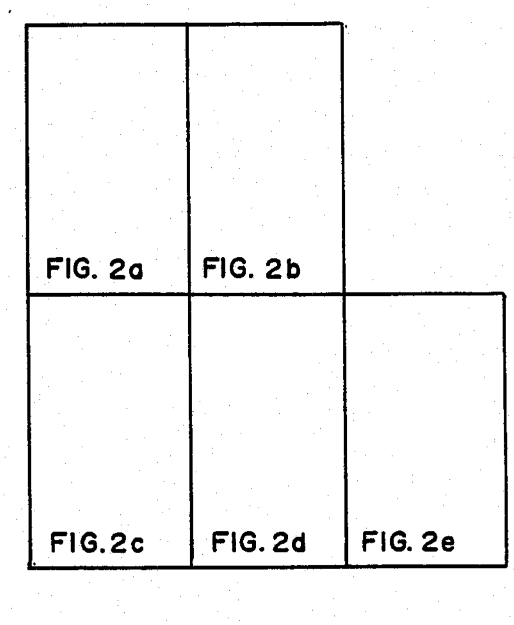
Figure 2A:
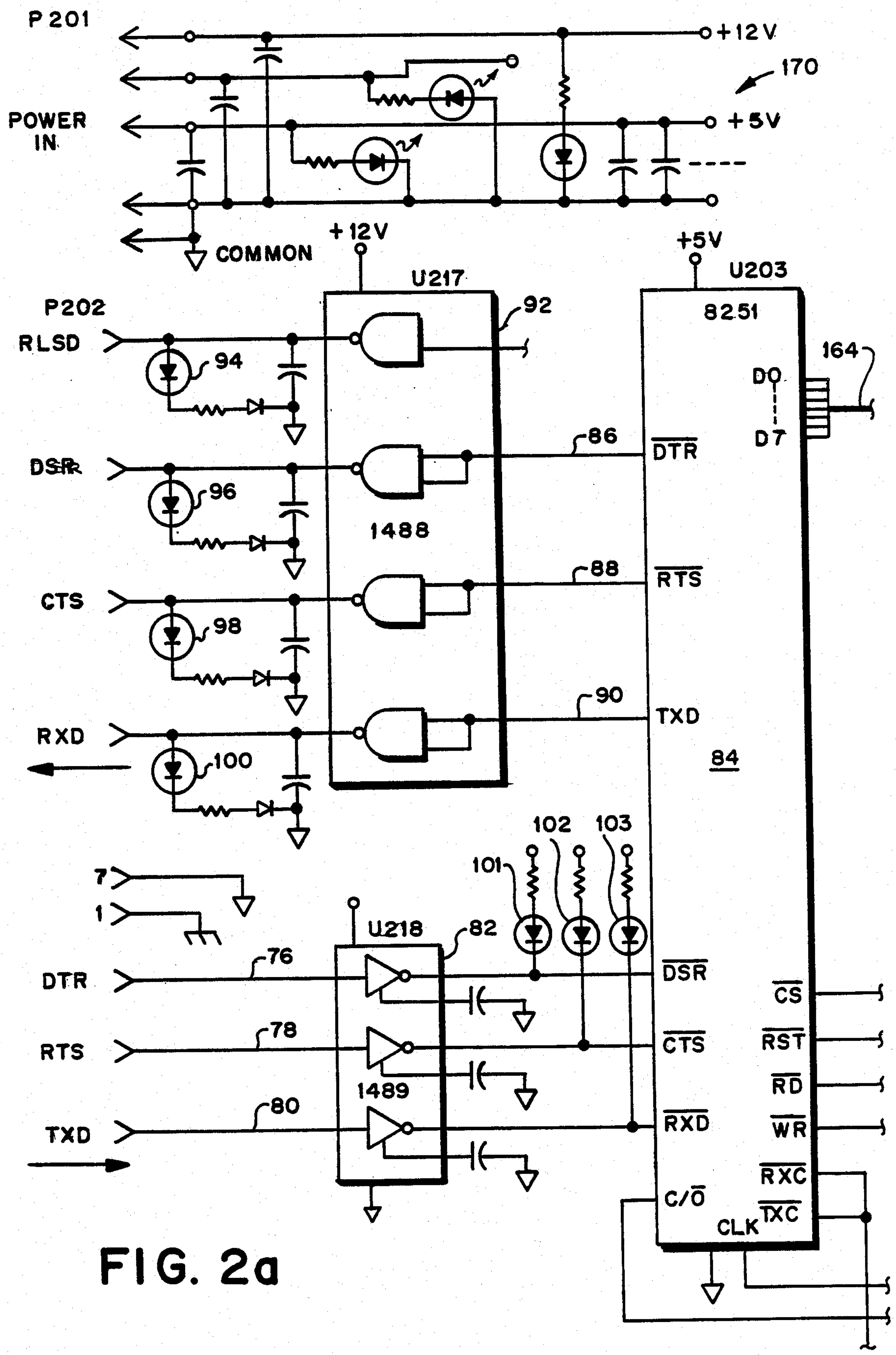
Figure 2B:
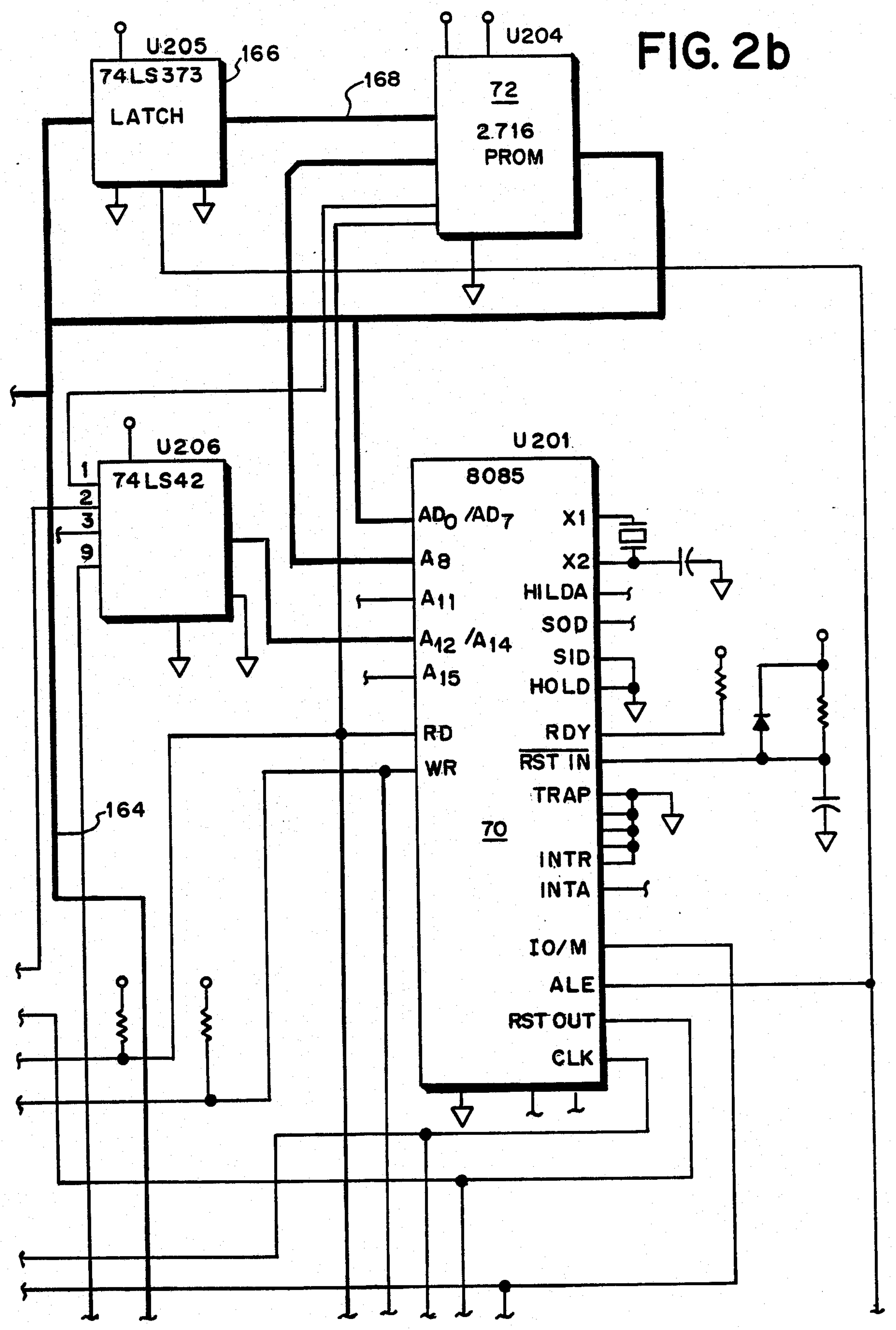
Figure 2C:
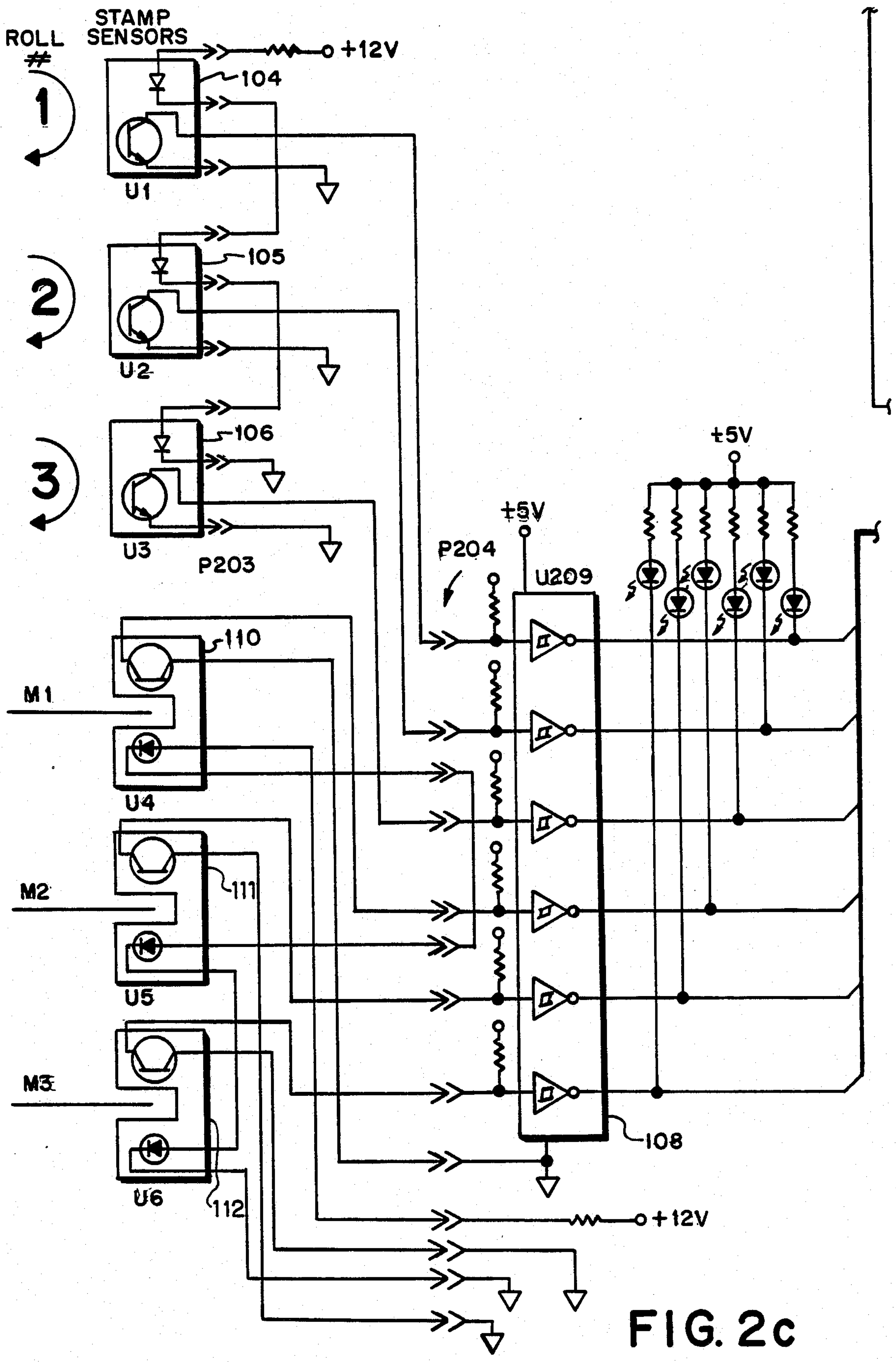
Figure 2D:
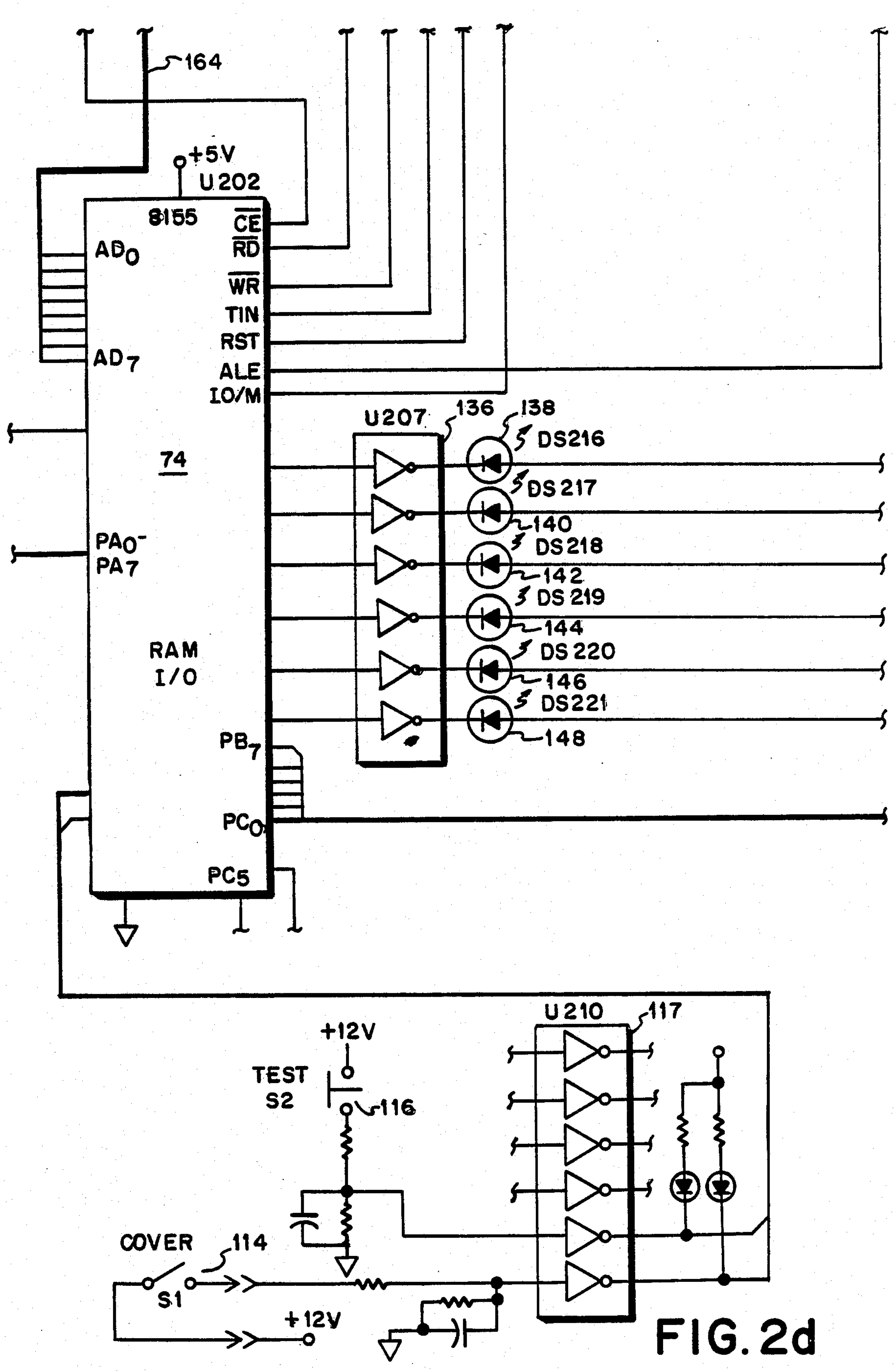
Figure 2E:
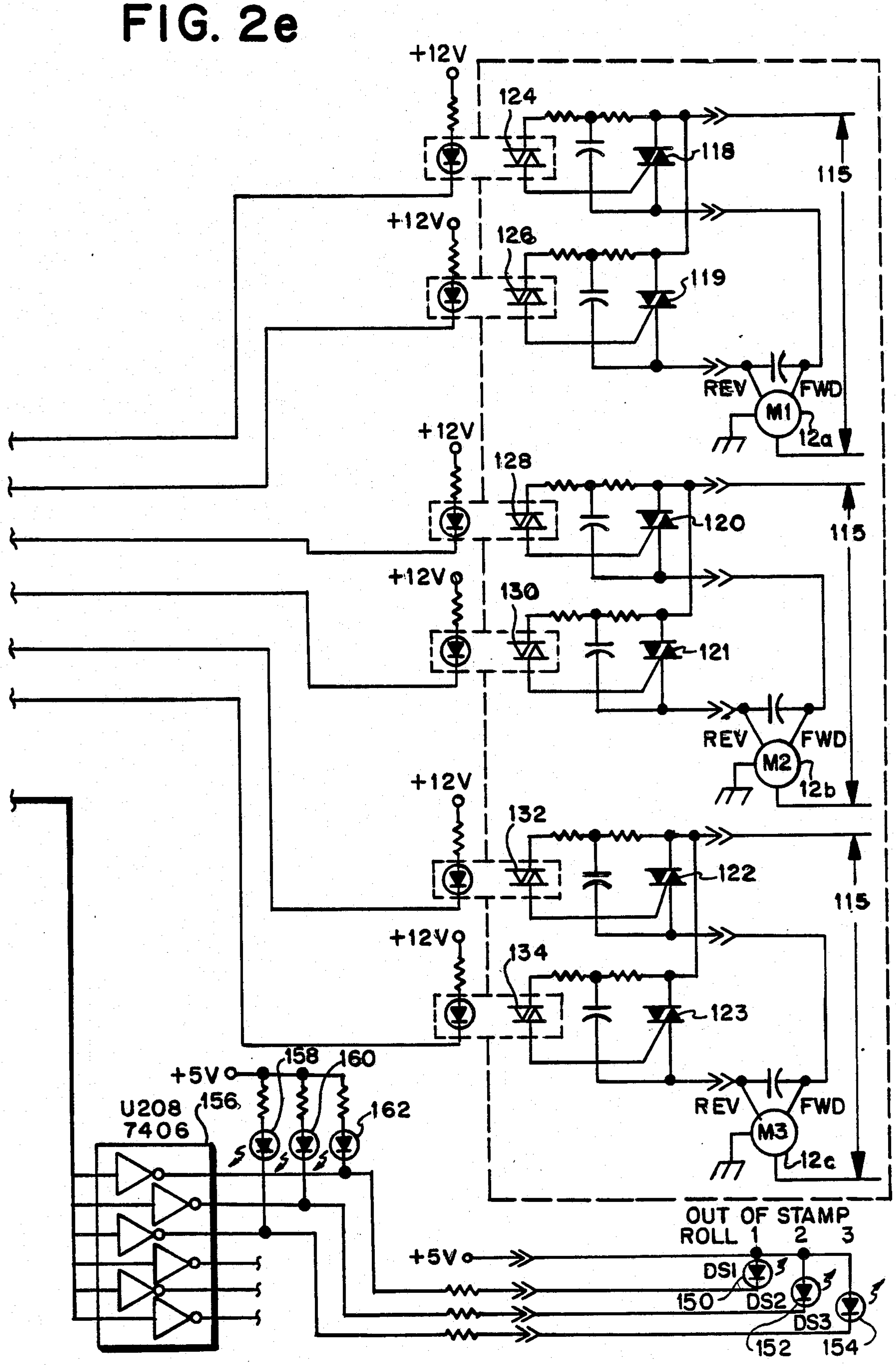

The routine in the interface according to the invention proceeds to set the parameters for Motor #2, i.e. motor 12*b* of FIG. 2. In this case, there are no stamps to be issued and thus motor #3, motor 12*c* of FIG. 2 is actuated. Since there is only one stamp to be dispensed, SCR 122 is appropriately gated to operate the motor for two complete revolutions to dispense the one stamp.

It will be understood that the computer may also send diagnostic exercise commands in the text as well as reset commands, or loop back commands so as to check the message as received by the dispenser. Thus as mentioned in conjunction with the DTEXT subroutine, the function byte is checked to see if such command is present. The intent of such an exercise is to allow the computer operator to check any of the motors. In most cases, the exercise of the motor should be effective to clear a motor or stamp jam without further intervention by an operator.

A typical exercise to be utilized by such command would, for example, switch on SCR's 119, 121, and 123 to operate the motors for one revolution in the reverse direction. Subsequent command would then advance the motors until one stamp was dispensed and the mechanism is again in home position. Other similar jam-clearing exercises will occur to one in the art and which can be implemented in a routine manner. It will be further appreciated that a particular motor may be selectably actuated by providing for transmission and receipt of a predetermined text byte.

Text switch 116 is intended to provide a service person with a means to test the operation of the dispenser. For best results, each motor is sequentially energized so as to make one revolution in the reverse direction. After motor 3 stops, all three motors are energized in the forward direction and simultaneously feed one stamp, that is 3 revolutions forward. In accordance with the invention, the out-of-stamp indicators are flashed to provide indication of the various errors which are tested during the energization of the motors. If errors are encountered, the test stops at the point that the error occurred and one or more of the Out-of-Stamp indicators are made to flash. Preferably after such error is detected, no orders will be receivable by the stamp dispenser interface and the dispenser can only exit this mode by the removal of power from the dispenser.

For example, in the instant embodiment following sequence is implemented. Motor errors are indicated by fast flashing of the corresponding out-of-stamp indicator. Communication errors are indicated by slow flashing of the out-of-stamp indicators. If during testing of the communication port, a status error is detected it may be indicated by slow flashing of indicator #1, LED 150. If no character is received, a time out occurs and indicator #2, LED 152, is made to flash slowly. If the wrong byte is received, indicators 150 and 152 are made to flash slowly. Other combinations of signal will occur to one skilled in the are for encoding various detectable errors.

Appendix A attached hereto is a detailed print out of a program for the interface for control of the various operations discussed above in conjunction with the illustrated embodiment.

It will be understood that the claims are intended to cover all changes and modifications of the embodiment therein chosen for the purpose of illustration which do not constitute departures from the scope and spirit of the invention.

APPENDIX A

ISIS-II 8080/8085 MACRO ASSEMBLER, V3.0

```
LOC  OBJ        SOURCE STATEMENT

                ; Conditionals
0000            FALSE   EQU     0
FFFF            TRUE    EQU     NOT FALSE
FFFF            SN7407  EQU     TRUE            ; True if motor port buffered w/non-inverting IC
                ;PORT DEFINITIONS
0070            PORTO   EQU     70H
0071            PORTA   EQU     PORTO+1
0072            PORTB   EQU     PORTA+1
0073            PORTC   EQU     PORTB+1
0074            PORTD   EQU     PORTC+1
0075            PORTE   EQU     PORTD+1
0010            PORTRS  EQU     10H
1000            RSDATA  EQU     1000H
7000            RAMST   EQU     7000H
70FF            RAMEND  EQU     70FFH
                ;RS232 DEFINITIONS
0011            DC1     EQU     11H             ;TRANSMIT ENABLE
0013            DC3     EQU     13H             ;TRANSMIT DISABLE
0002            STX     EQU     2               ;START OF TEXT
0003            ETX     EQU     3               ;END OF TEXT
000E            BADECC  EQU     0EH             ;BAD ECC FOUND CONTROL CODE
0006            BADXCH  EQU     6               ; Illegal Message control code
000A            BADFMT  EQU     0AH             ; Format Error control code
0000            FUNCOK  EQU     0               ;NO ERROR XCH BYTE
0000            ST0FNC  EQU     0               ;STATUS 0 FUNCTION
0001            ST1FNC  EQU     1
0002            ST2FNC  EQU     2
0010            ERRLNG  EQU     10H             ; VLI for error messages
                ;BIT DEFINITIONS
0080            COVBT   EQU     80H
0040            OUTST1  EQU     40H
0080            OUTST2  EQU     80H
0001            OUTST3  EQU     1
0040            TESTBT  EQU     40H             ; Test switch bit position (0=active)
                ; Error codes (for test routines)
0040            RSERR1  EQU     40H             ; Bad RS-232 status
0080            RSERR2  EQU     80H             ; Timeout before character reveived
00C0            RSERR3  EQU     0C0H            ; Char received .NE. char sent
00C1            TSTCOD  EQU     0C1H            ; Out of stamp LED test code
0001            RAMERR  EQU     1               ; RAM error code
0041            ROMERR  EQU     41H             ; ROM error code
                ;MOTOR CONTROL BIT INFORMATION
0001            M1BIT   EQU     1               ;CONTROL BIT FOR MOTOR ONE OUTPUT PORT
0008            M1ENCD  EQU     8               ;MOTOR ONE ENCODER BIT
0004            M2BIT   EQU     4
0010            M2ENCD  EQU     10H
0010            M3BIT   EQU     10H
0020            M3ENCD  EQU     20H
2000            REVTIM  EQU     2000H           ;MOTOR REVERSE DELAY ~50MS
                ;STAMP SENSOR BIT INFORMATION
0001            SS1BIT  EQU     1               ;STAMP SENSOR 1 BIT POSITION
0002            SS2BIT  EQU     2
0004            SS3BIT  EQU     4
                ;MOTOR STATUS DEFINITIONS
0000            NOACT   EQU     0               ;MOTOR IS NOT ACTIVE
0001            DNTLT   EQU     1               ;MOTOR HAS BEEN TURNED ON, AND WAITING FOR
                                                ;FIRST DARK TO LIGHT ENCODER TRANSITION
0002            FLTDK   EQU     2               ;ENCODER HAS GONE LIGHT AND MOTOR IS DRIVING
                                                ;TOWARDS A TRANSITION TO DARK
0003            DKLT    EQU     3               ;ENCODER HAS GONE DARK, AND NOW WAITING FOR
                                                ;TRANSITION TO LIGHT
0004            SLTDK   EQU     4               ;SECOND TIME MOTOR ENCODER HAS GONE LIGHT, NOW
                                                ;WAITING FOR IT TO GO DARK AGAIN.  WHEN IT
                                                ;DOES, A STAMP HAS BEEN DISPENSED.
0005            MTOFF   EQU     5               ; Motor finished dispensing - delay state until
                                                ;    motor is turned off
0006            NAVAIL  EQU     6               ;MOTOR NOT CURRENTLY AVAILABLE FOR USE
                ;MOTOR ERROR DEFINITIONS
```

```
0000                  NOERR   EQU     0               ;MOTOR AVAILABLE FOR USE
0002                  MOFF    EQU     2               ;MOTOR NOT FUNCTIONAL
0001                  SJAM    EQU     1               ;STAMP JAM HAS BEEN SENSED
0004                  SOUT    EQU     4               ;OUT OF STAMPS

                      ;DEFINITIONS AND OFFSETS OF ITEMS IN EACH MOTOR STATE TABLE

0000                  MSTAT   EQU     0               ;MOTOR STATUS BYTE
0001                  TIMOT   EQU     MSTAT+1         ;CURRENT TIMEOUT VALUE FOR MOTOR
0003                  STOFD   EQU     TIMOT+2         ;TOTAL STAMPS FOR MOTOR TO FEED
0005                  STFD    EQU     STOFD+2         ;TOTAL STAMPS FED SO FAR
0007                  ERRST   EQU     STFD+2          ;MOTOR ERROR STATUS
0008                  OOSCNT  EQU     ERRST+1         ;OUT OF STAMP COUNT (STAMPS LEFT BEFORE ERROR
                                                      ;GENERATED)
0009                  MCMND   EQU     OOSCNT+1        ; Motor Commanded flag
000A                  PERFF   EQU     MCMND+1         ; Perferation detected flag
000B                  MSTLNG  EQU     11              ;LENGTH OF ONE MOTOR STATE TABLE

                      ;RAM LAYOUT OF MOTOR STATE TABLES AND VARIABLES

7000                          ORG     RAMST
7000                  M1TAB:  DS      MSTLNG          ;STATE TABLE FOR MOTOR 1
700B                  M2TAB:  DS      MSTLNG          ;STATE TABLE FOR MOTOR 2
7016                  M3TAB:  DS      MSTLNG          ;STATE TABLE FOR MOTOR 3
7021                  MBIT:   DS      1               ;CONTAINS A BIT, CORRESPONDING TO CURRENT
                                                      ;MOTOR'S OUTPUT BIT POSITION
7022                  MENCD:  DS      1               ;CONTAINS A BIT, CORRESPONDING TO CURRENT
                                                      ;MOTOR'S ENCODER INPUT BIT POSITION
7023                  SBIT:   DS      1               ;CURRENT MOTOR'S STAMP SENSOR INPUT BIT
7024                  MOUT:   DS      1               ;CONTAINS CURRENT VALUE OF MOTOR OUTPUT PORT
7025                  RAMPTR: DS      2               ;POINTER TO CURRENT MOTOR STATE TABLE
7027                  FTEST:  DS      1               ; Flags for stamp positioning during test
7028                  NXTST:  DS      1               ; Next state to succeed motor reversal
7029                  NXTTIM: DS      2               ; Timeout value for NXTST
702B                  TENAB:  DS      1               ;TRANSMIT ENABLE FLAG
702C                  RSBUF:  DS      30              ;RS232 INPUT BUFFER
704A                  OUTBUF: DS      30              ;RS232 OUTPUT BUFFER
70FF                  STAK    EQU     RAMEND          ;STACK POINTER


                      ;PROGRAM START

0000                          ORG     0

0000 014B00           BEGIN:  LXI     B,75            ;INIT TIMER COUNTDOWN VALUE
0003 79                       MOV     A,C
0004 D374                     OUT     PORTD           ;DO LOW ORDER BYTE
0006 78                       MOV     A,B
0007 C640                     ADI     40H             ;ADD IN SQUARE WAVE BIT
0009 D375                     OUT     PORTE           ;AND OUTPUT HI ORDER BYTE
000B 3ECE                     MVI     A,0CEH
000D D370                     OUT     PORTO           ;INIT 8155
000F AF                       XRA     A
0010 D373                     OUT     PORTC

                              IF      SN7407
0012 EE3F                     XRI     3FH
                              ENDIF

0014 D372                     OUT     PORTB           ;TURN OFF OUTPUT PORTS
0016 3E4E                     MVI     A,4EH
0018 D310                     OUT     PORTRS
001A 3E37                     MVI     A,37H
001C D310                     OUT     PORTRS
001E 31FF70                   LXI     SP,STAK         ;SET STACK POINTER
0021 CD4701                   CALL    ROMCHK
0024 0641                     MVI     B,ROMERR
0026 C29B07                   JNZ     TSTERR          ;JUMP IF BAD
0029 06FF                     MVI     B,0FFH          ;FIRST RAM CHECK BYTE
002B 110001                   LXI     D,RAMEND-RAMST+1 ;GET LENGTH OF RAM
002E 210070                   LXI     H,RAMST         ;START OF RAM
0031 70               RAM1:   MOV     M,B             ;PUT IN CHECK BYTE
0032 7E                       MOV     A,M             ;GET IT BACK
0033 B8                       CMP     B               ;COMPARE TO ORIGINAL VALUE
0034 C24201                   JNZ     RAMBAD          ;JUMP IF ERROR
0037 23                       INX     H               ;NEXT RAM BYTE
0038 1B                       DCX     D               ;CHECK COUNT
0039 7A                       MOV     A,D
003A B3                       ORA     E
003B C23100                   JNZ     RAM1            ;JUMP IF NOT DONE
003E 0600                     MVI     B,0             ;FINAL CHECK WITH 0 ALSO
0040 110001                   LXI     D,RAMEND-RAMST+1 ;GET LENGTH OF RAM
0043 210070                   LXI     H,RAMST         ;START OF RAM
0046 70               RAM4:   MOV     M,B             ;PUT IN CHECK BYTE
0047 7E                       MOV     A,M             ;GET IT BACK
0048 B8                       CMP     B               ;COMPARE TO ORIGINAL VALUE
0049 C24201                   JNZ     RAMBAD          ;JUMP IF ERROR
004C 23                       INX     H               ;NEXT RAM BYTE
004D 1B                       DCX     D               ;CHECK COUNT
004E 7A                       MOV     A,D
004F B3                       ORA     E
0050 C24600                   JNZ     RAM4            ;JUMP IF NOT DONE
```

```
0053 21D107                  LXI   H,NULMSG
0056 114A70                  LXI   D,OUTBUF       ; Put NULMSG in OUTBUF incase we have to
0059 0604                    MVI   B,4            ;   retransmit after reset
005B 7E              DONUL:  MOV   A,M
005C 12                      STAX  D
005D 13                      INX   D
005E 23                      INX   H
005F 05                      DCR   B
0060 C25B00                  JNZ   DONUL
0063 212470          LOOP:   LXI   H,MOUT
0066 AF                      XRA   A              ; Turn off motors and OOS LEDS
0067 77                      MOV   M,A
0068 D373                    OUT   PORTC

                             IF    SN7407
006A EE3F                    XRI   3FH
                             ENDIF

006C D372                    OUT   PORTB
006E 210070                  LXI   H,M1TAB
0071 CDFC04                  CALL  ERRG1
0074 E604                    ANI   SOUT
0076 CA7E00                  JZ    L001
0079 3E40                    MVI   A,OUTST1
007B CD8103                  CALL  DOMOT          ; Turn on Motor 1 LED
007E 210B70          L001:   LXI   H,M2TAB
0081 CDFC04                  CALL  ERRG1
0084 E604                    ANI   SOUT
0086 CA8E00                  JZ    L002
0089 3E80                    MVI   A,OUTST2
008B CD8103                  CALL  DOMOT          ; Turn on Motor 2 LED
008E 211670          L002:   LXI   H,M3TAB
0091 CDFC04                  CALL  ERRG1
0094 E604                    ANI   SOUT
0096 CA9D00                  JZ    L003
0099 3E01                    MVI   A,OUTST3
009B D373                    OUT   PORTC          ; Turn on Motor 3 LED
009D DB71            L003:   IN    PORTA
009F E640                    ANI   TESTBT
00A1 CA1007                  JZ    TEST           ; Branch to test routine if switch active
00A4 CD6501                  CALL  INSTAT
00A7 CA6300                  JZ    LOOP           ; Loop if no character in receiver
00AA 3A0010                  LDA   RSDATA
00AD FE02                    CPI   STX            ; Check for start of message
00AF CACC00                  JZ    L1
00B2 FE11                    CPI   DC1
00B4 CAC400                  JZ    L01            ; Branch if DC1
00B7 FE13                    CPI   DC3
00B9 CAC600                  JZ    L03            ; Branch if DC3
00BC 3E0A            FMTERR: MVI   A,BADFMT
00BE CDA801                  CALL  OUTST          ; Send error response if garbage received
00C1 C36300                  JMP   LOOP
00C4 3E01            L01:    MVI   A,1
00C6 322B70          L03:    STA   TENAB          ; Update transmit enable flag
00C9 C36300                  JMP   LOOP
00CC CD1401          L1:     CALL  READIN         ;GET IN THE INPUT STRING
00CF C26300                  JNZ   LOOP           ; Loop if ECC error
00D2 CD1A05                  CALL  DECOD          ;DECODE IT AND SETUP MOTOR CONTROL VALUES
00D5 CDC102                  CALL  COVCHK         ;SEE IF COVER OPEN
00D8 C2DE00                  JNZ   L2             ;JUMP IF OPEN
00DB CDE800                  CALL  MOTON          ; Start your motors, gentlemen
00DE CDBB01          L2:     CALL  STAT           ;OUTPUT DISPENSE STATUS
00E1 AF              L3:     XRA   A
00E2 322770                  STA   FTEST          ; Clear TEST flags
00E5 C36300                  JMP   LOOP           ;GET NEXT COMMAND

                     ; This routine starts the motors (if necessary)

00E8 3A2470          MOTON:  LDA   MOUT           ;INIT MOTOR CONTROL BYTE
00EB 47                      MOV   B,A
00EC 3A0070                  LDA   M1TAB          ;MOTOR 1 STATE
00EF 0E01                    MVI   C,M1BIT        ;MOTOR 1 CONTROL BIT
00F1 CDB502                  CALL  MSET           ;SETUP MOTOR CONTROL BYTE
00F4 3A0B70                  LDA   M2TAB          ;MOTOR 2 STATE
00F7 0E04                    MVI   C,M2BIT        ;MOTOR 2 CONTROL BIT
00F9 CDB502                  CALL  MSET           ;SETUP MOTOR CONTROL BYTE
00FC 3A1670                  LDA   M3TAB          ;MOTOR 3 STATE
00FF 0E10                    MVI   C,M3BIT        ;MOTOR 3 CONTROL BIT
0101 CDB502                  CALL  MSET           ;SETUP MOTOR CONTROL BYTE
0104 78                      MOV   A,B            ;GET MOTOR CONTROL BYTE
0105 322470                  STA   MOUT           ;SAVE IT

                             IF    SN7407
0108 EE3F                    XRI   3FH
                             ENDIF

010A D372                    OUT   PORTB          ;OUTPUT IT

                             IF    SN7407
010C EE3F                    XRI   3FH
                             ENDIF

010E E63F                    ANI   3FH            ;ISOLATE MOTOR BYTES
0110 C40803                  CNZ   MRUN           ;DISPENSE STAMPS IF INDICATED
```

```
0113 C9                 RET

                  ;READ IN A MESSAGE INTO INPUT BUFFER.
                  ;IF ECC ERROR, return w/ zero flag false

0114 212C70       READIN: LXI     H,RSBUF         ;BUFFER POINTER
0117 77                   MOV     M,A             ;SAVE IN BUFFER
0118 23                   INX     H
0119 0600                 MVI     B,0             ;INIT ECC BYTE
011B CD5B01               CALL    INCHAR          ;GET LENGTH BYTE
011E 77                   MOV     M,A             ;SAVE IN BUFFER
011F 23                   INX     H
0120 57                   MOV     D,A             ;SAVE AS COUNT
0121 A8                   XRA     B
0122 47                   MOV     B,A             ;DATA CHECK
0123 CD5B01       READ2:  CALL    INCHAR
0126 77                   MOV     M,A             ;GET IN A BYTE
0127 23                   INX     H
0128 A8                   XRA     B
0129 47                   MOV     B,A             ;DATA CHECK
012A 15                   DCR     D               ;BYTE COUNT
012B C22301               JNZ     READ2           ;JUMP IF MORE
012E 2B                   DCX     H
012F 7E                   MOV     A,M
0130 23                   INX     H
0131 FE03                 CPI     ETX             ; Test that ETX byte correct
0133 3E0A                 MVI     A,BADFMT
0135 C2A801               JNZ     OUTST           ; Report error if detected
0138 CD5B01               CALL    INCHAR          ;GET ECC BYTE
013B B8                   CMP     B
013C C8                   RZ                      ;DONE IF NO ERROR
013D 3E0E                 MVI     A,BADECC        ;ERROR BYTE
013F C3A801               JMP     OUTST           ;OUTPUT IT (returns w/ zero flag false)

0142 0601         RAMBAD: MVI     B,RAMERR
0144 C39B07               JMP     TSTERR

                  ; ROMCHK adds all bytes contained in the EPROM from BEGIN to the CHKSUM value
                  ;   The CHKSUM value is calculated so that the result of ROMCHK is 0 if the
                  ;   EPROM is programmed properly (ROMCHK result is returned in A).

0147 210000       ROMCHK: LXI     H,BEGIN
014A 11E507               LXI     D,CHKSUM-BEGIN+1
014D AF                   XRA     A               ; Initialize regs for checksum calculation
014E F5                   PUSH    PSW
014F F1           ROMC10: POP     PSW             ; Restore running total
0150 86                   ADD     M               ; Add in next byte
0151 F5                   PUSH    PSW             ; Save the result
0152 23                   INX     H
0153 1B                   DCX     D
0154 7B                   MOV     A,E
0155 B2                   ORA     D
0156 C24F01               JNZ     ROMC10          ; Loop til done
0159 F1                   POP     PSW             ; Restore final sum
015A C9                   RET

                  ;
                  ;GET AN INPUT CHARACTER FROM THE RS232 INTO A

015B CD6501       INCHAR: CALL    INSTAT          ;GET INPUT STATUS
015E CA5B01               JZ      INCHAR          ;JUMP IF NO CHAR READY
0161 3A0010               LDA     RSDATA
0164 C9                   RET

                  ;
                  ;CHECK RS232 PORT INPUT STATUS
                  ;
                  ;OUTPUT:          ZERO FLAG SET IF NO CHAR READY, ELSE RESET

0165 DB10         INSTAT: IN      PORTRS
0167 E602                 ANI     2
0169 C9                   RET

                  ;OUTPUT THE CHARACTER IN C TO THE RS232 PORT

016A DB10         OUTCHR: IN      PORTRS
016C E601                 ANI     1
016E CA6A01               JZ      OUTCHR          ;WAIT FOR TRANSMIT READY BIT
0171 79                   MOV     A,C
0172 320010               STA     RSDATA
0175 C9                   RET

                  ;CHECK IF SYSTEM HAS TRANSMIT ENABLE FLAG OFF
                  ;IF FLAG IS ON, THEN WAIT FOR A DC3 FROM THE TERMINAL
                  ;TO SET THE STATE FROM TRANSMIT TO RECEIVE

0176 3A2B70       INWAIT: LDA     TENAB           ;SEE IF TRANSMIT ENABLE FLAG OFF
0179 A7                   ANA     A               ;IF OFF, READY TO RECEIVE
017A C8                   RZ
017B CD5B01       INW1:   CALL    INCHAR          ;ELSE WAIT FOR DC3 TO START RECEIVE MODE
017E FE13                 CPI     DC3
0180 C27B01               JNZ     INW1
0183 AF           INW2:   XRA     A
```

```
0184 322B70                    STA     TENAB           ;CLEAR TRANSMIT FLAG TO RECEIVE STATE
0187 C9                        RET

              ;CHECK IF SYSTEM HAS TRANSMIT ENABLE FLAG ON
              ;IF FLAG IS OFF, THEN WAIT FOR A DC1 FROM THE TERMINAL
              ;TO SET THE STATE FROM RECEIVE TO TRANSMIT

0188 3A2B70       OUTWT:       LDA     TENAB           ;SEE IF TRANSMIT ENABLE FLAG ON
018B A7                        ANA     A               ;IF ON, READY TO TRANSMIT
018C C0                        RNZ
018D CD5E01       OUTW1:       CALL    INCHAR          ;ELSE WAIT FOR DC1 TO START TRANSMIT MODE
0190 FE11                      CPI     DC1
0192 C28D01                    JNZ     OUTW1
0195 213075                    LXI     H,30000         ;INIT TIMEOUT VALUE
0198 CDA101                    CALL    WAIT            ;AND WAIT
019B 3E01         OUTW2:       MVI     A,1
019D 322B70                    STA     TENAB           ;SET TRANSMIT FLAG ON
01A0 C9                        RET

              ;WAIT TIME DETERMINED BY VALUE IN HL
              ;  Duration is approximatelv 7 usec. * HL

01A1 2B           WAIT:        DCX     H
01A2 7D                        MOV     A,L
01A3 B4                        ORA     H
01A4 C2A101                    JNZ     WAIT
01A7 C9                        RET

              ;OUTPUT THE STATUS BYTE ACK OF NACK
              ;A CONTAINS THE XCW BYTE FOR MESSAGE

01A8 F5           OUTST:       PUSH    PSW             ;SAVE BYTE
01A9 CD8801                    CALL    OUTWT           ;WAIT FOR TRANSMIT ENABLE MODE
01AC 214A70                    LXI     H,OUTBUF
01AF 3602                      MVI     M,STX           ;START TRANSMISSION
01B1 23                        INX     H               ; Bump OUTBUF pointer
01B2 3602                      MVI     M,2             ;LENGTH BYTE
01B4 23                        INX     H               ; Bump OUTBUF pointer
01B5 F1                        POP     PSW             ;XCW BYTE
01B6 77                        MOV     M,A             ; Save in OUTBUF
01B7 23                        INX     H               ; Bump OUTBUF pointer
01B8 C34402                    JMP     STSEND          ; Append ETX and output message

              ;
              ;ROUTINE TO OUTPUT DISPENSER STATUS TO NCR TERMINAL
              ;

01BB 214A70       STAT:        LXI     H,OUTBUF        ;OUTPUT BUFFER
01BE 3602                      MVI     M,STX           ;START OF MESSAGE
01C0 23                        INX     H
01C1 3610                      MVI     M,ERRLNG        ; Length of message
01C3 23                        INX     H
01C4 3601                      MVI     M,1             ;PUT IN XCW
01C6 23                        INX     H
01C7 3611                      MVI     M,DC1           ;NEXT IS ESCAPE
01C9 23                        INX     H
01CA CDC102                    CALL    COVCHK          ;SEE IF COVER OPEN
01CD C21E02                    JNZ     COVOP           ;JUMP IF OPEN

01D0 EB                        XCHG
01D1 210070                    LXI     H,M1TAB         ;CHECK FOR ANY ERRORS
01D4 CD0305                    CALL    CERRGT
01D7 C2F101                    JNZ     ST0             ;JUMP IF ERROR FOUND
01DA 210B70                    LXI     H,M2TAB         ; (Check commanded motors only)
01DD CD0305                    CALL    CERRGT
01E0 C2F101                    JNZ     ST0
01E3 211670                    LXI     H,M3TAB
01E6 CD0305                    CALL    CERRGT
01E9 C2F101                    JNZ     ST0

01EC 3E00                      MVI     A,FUNCOK        ;SEND BACK FUNCTION OK
01EE C3A801                    JMP     OUTST

              ;REACH HERE IF A STAMP OR MOTOR ERROR FOUND

01F1 210070       ST0:         LXI     H,M1TAB         ;REACH HERE IF MOTOR JAM ERROR
01F4 CDFC04                    CALL    ERRG1
01F7 E602                      ANI     MOFF
01FA CA1802                    JZ      ST1             ;CHECK IF ALL 3 MOTORS JAMMED OR NOT
01FC 210B70                    LXI     H,M2TAB
01FF CDFC04                    CALL    ERRG1           ;JUMPS ARE TAKEN IF ANY MOTOR IS NOT JAMMED
0202 E602                      ANI     MOFF
0204 CA1802                    JZ      ST1
0207 211670                    LXI     H,M3TAB
020A CDFC04                    CALL    ERRG1
020D E602                      ANI     MOFF
020F CA1802                    JZ      ST1

              ;REACH HERE IF ALL MOTORS JAMMED
```

```
0212 EB                       XCHG
0213 3602             MVI     M,ST2FNC      ;ERROR FUNCTION CODE
0215 C32002           JMP     COV1          ;AND FINISH UP MESSAGE

              ;REACH HERE IF ONLY 1 OR 2 MOTORS JAMMED, STAMP JAM, OR OUT OF STAMPS

0218 EB       ST1:    XCHG
0219 3600             MVI     M,ST0FNC      ;ERROR FUNCTION CODE
021B C32002           JMP     COV1          ;FINISH UP MESSAGE

              ;REACH HERE IF COVER OPEN MESSAGE

021E 3601     COVOP:  MVI     M,ST1FNC      ;FUNCTION CODE
0220 23       COV1:   INX     H
0221 EB               XCHG                  ; Message pointer to DE
0222 210070           LXI     H,M1TAB
0225 CDFC04           CALL    ERRG1
0228 C630             ADI     '0'
022A 12               STAX    D             ; Set Motor 1 Status word
022B 13               INX     D
022C 210B70           LXI     H,M2TAB
022F CDFC04           CALL    ERRG1
0232 C630             ADI     '0'
0234 12               STAX    D             ; Set Motor 2 Status word
0235 13               INX     D
0236 211670           LXI     H,M3TAB
0239 CDFC04           CALL    ERRG1
023C C630             ADI     '0'
023E 12               STAX    D             ; Set Motor 3 Status word
023F 13               INX     D
0240 EB               XCHG                  ; Message pointer back to HL

0241 CD6B02           CALL    STCNT         ;PUT STAMP COUNT IN BUFFER

              ;OUTPUT THE STATUS MESSAGE TO NCR

0244 3603     STSEND: MVI     M,ETX         ;MESSAGE END
0246 CD8801   STS0:   CALL    OUTWT         ;WAIT FOR OUTPUT ENABLE
0249 214A70           LXI     H,OUTBUF      ;OUTPUT BUFFER
024C 4E               MOV     C,M           ;GET STX
024D CD6A01           CALL    OUTCHR        ;AND OUTPUT IT
0250 0600             MVI     B,0           ;INIT ECC
0252 23               INX     H
0253 4E               MOV     C,M           ;LENGTH BYTE
0254 79               MOV     A,C
0255 A8               XRA     B             ;HANDLE ECC
0256 47               MOV     B,A
0257 59               MOV     E,C           ;LENGTH COUNTER
0258 CD6A01           CALL    OUTCHR        ;OUTPUT IT
025B 23       STS1:   INX     H
025C 4E               MOV     C,M
025D 79               MOV     A,C
025E A8               XRA     B
025F 47               MOV     B,A
0260 CD6A01           CALL    OUTCHR        ;OUTPUT 1 CHAR
0263 1D               DCR     E             ;CHECK COUNT
0264 C25B02           JNZ     STS1
0267 48               MOV     C,B           ;OUTPUT ECC BYTE
0268 C36A01           JMP     OUTCHR

              ;
              ;ROUTINE TO CONVERT STAMPS FED INTO ASCII DIGITS AND PUT THEM IN BUFFER
              ;
              ;INPUT: HL CONTAINS POINTER TO OUTPUT BUFFER

026B 110070   STCNT:  LXI     D,M1TAB       ;POINT TO MOTOR 1 STATE TABLE
026E CD7A02           CALL    STCN0         ;HANDLE IT'S COUNT
0271 110B70           LXI     D,M2TAB       ;DO MOTORS 2 AND 3 ALSO
0274 CD7A02           CALL    STCN0
0277 111670           LXI     D,M3TAB

027A EB       STCN0:  XCHG
027B 010500           LXI     B,STFD        ;OFFSET TO STAMPS FED
027E 09               DAD     B             ;POINT TO STAMP COUNT
027F D5               PUSH    D             ;SAVE OUTPUT BUFFER POINTER
0280 5E               MOV     E,M           ;GET COUNT
0281 23               INX     H
0282 56               MOV     D,M
0283 EB               XCHG
0284 1E00             MVI     E,0           ;INIT HUNDREDS COUNT
0286 019CFF           LXI     B,-100
0289 7C       STCN1:  MOV     A,H           ;CHECK HI ORDER BYTE
028A A7               ANA     A
028B CA9302           JZ      STCN2         ;JUMP IF ZERO
028E 1C               INR     E             ;ANOTHER HUNDREDS
028F 09               DAD     B             ;SUBTRACT 100
0290 C38902           JMP     STCN1         ;LOOP TILL H IS ZERO

0293 7D       STCN2:  MOV     A,L
0294 E1               POP     H             ;BUFFER POINTER
0295 0664             MVI     B,100         ;FIRST DO 100'S DIGIT
0297 CDAB02           CALL    BID1
029A 47               MOV     B,A
```

```
029B 7B             MOV     A,E         ;HUNDREDS COUNT FROM BEFORE
029C 2B             DCX     H
029D 86             ADD     M           ;ADD TO CURRENT VALUE
029E 77             MOV     M,A
029F 23             INX     H
02A0 78             MOV     A,B         ;GET BACK VALUE LEFT
02A1 060A           MVI     B,10        ;NOW DO 10'S DIGIT
02A3 CDAB02         CALL    BID1
02A6 C630           ADI     '0'         ;ONLY UNITS LEFT
02A8 77             MOV     M,A
02A9 23             INX     H
02AA C9             RET

02AB 362F    BID1:  MVI     M,'0'-1     ;INIT DIGIT COUNT
02AD 34      BID2:  INR     M
02AE 90             SUB     B           ;CHECK DIGIT
02AF D2AD02         JNC     BID2
02B2 80             ADD     B           ;RESTORE VALUE
02B3 23             INX     H
02B4 C9             RET

             ;THIS ROUTINE CHECKS IF A MOTOR SHOULD BE RUN OR NOT AND INITS THE
             ;MOTOR CONTROL BYTE FOR EACH MOTOR.
             ;
             ;INPUT: A CONTAINS THE MOTOR STATE. C CONTAINS THE MOTOR CONTROL BIT
             ;       B CONTAINS THE MOTOR CONTROL BYTE SOFAR
             ;
             ;OUTPUT: B CONTAINS UPDATED VALUE OF MOTOR CONTROL BYTE

02B5 FE01    MSET:  CPI     ONTLT       ;SEE IF SHOULD BE STARTED
02B7 CABD02         JZ      MSET1       ; Run if ONTLT
02BA FE03           CPI     DKLT        ;    or DKLT
02BC C0             RNZ
02BD 79      MSET1: MOV     A,C         ;GET MOTOR CONTROL BIT
02BE B0             ORA     B           ;OR IN WITH BYTE SO FAR
02BF 47             MOV     B,A         ;PUT IT BACK IN B
02C0 C9             RET

02C1 DB71    COVCHK: IN     PORTA
02C3 E680           ANI     COVBT       ;CHECK FOR COVER OPEN
02C5 C9             RET

             ;
             ; Routines to set up parameters for the 3 motors
             ;

02C6 210070  PARAM1: LXI    H,M1TAB         ;SET UP PARAMETERS FOR MOTOR 1
02C9 222570         SHLD    RAMPTR
02CC 3E01           MVI     A,M1BIT
02CE 322170         STA     MBIT
02D1 3E08           MVI     A,M1ENCD
02D3 322270         STA     MENCD
02D6 3E01           MVI     A,SS1BIT
02D8 322370         STA     SBIT
02DB C9             RET

02DC 210B70  PARAM2: LXI    H,M2TAB         ;SET UP PARAMETERS FOR MOTOR 2
02DF 222570         SHLD    RAMPTR
02E2 3E04           MVI     A,M2BIT
02E4 322170         STA     MBIT
02E7 3E10           MVI     A,M2ENCD
02E9 322270         STA     MENCD
02EC 3E02           MVI     A,SS2BIT
02EE 322370         STA     SBIT
02F1 C9             RET

02F2 211670  PARAM3: LXI    H,M3TAB         ;SET UP PARAMETERS FOR MOTOR 3
02F5 222570         SHLD    RAMPTR
02F8 3E10           MVI     A,M3BIT
02FA 322170         STA     MBIT
02FD 3E20           MVI     A,M3ENCD
02FF 322270         STA     MENCD
0302 3E04           MVI     A,SS3BIT
0304 322370         STA     SBIT
0307 C9             RET

             ;THIS ROUTINE WILL RUN ALL 3 MOTORS UNTIL THEY HAVE ALL COMPLETED THEIR
             ;DISPENSING OR ENCOUNTERED ERRORS.

0308 3A0070  MRUN:  LDA     M1TAB       ;CHECK IF ANY ACTIVE MOTORS
030B FE00           CPI     NOACT       ;CHECK IF MOTOR 1 NOT ACTIVE
030D CA1503         JZ      MR1         ;JUMP IF NOT ACTIVE
0310 FE06           CPI     NAVAIL
0312 C22B03         JNZ     MR3         ;JUMP IF BEING USED
0315 3A0B70  MR1:   LDA     M2TAB       ;SAME FOR MOTOR 2
0318 FE00           CPI     NOACT
031A CA2203         JZ      MR2
031D FE06           CPI     NAVAIL
031F C22B03         JNZ     MR3
```

```
0322 3A1670      MR2:     LDA     M3TAB
0325 FE00                 CPI     NOACT
0327 C8                   RZ                      ;DONE IF NONE GOING
0328 FE06                 CPI     NAVAIL
032A C8                   RZ
032B CD6501      MR3:     CALL    INSTAT          ;CHECK IF RECEIVE CHAR AVAILABLE
032E CA4603               JZ      MR35            ; Branch if no character available
0331 3A0010               LDA     RSDATA          ; Get the character
0334 FE11                 CPI     DC1
0336 C23E03               JNZ     MR31            ; Branch if not DC1
0339 3E01                 MVI     A,1             ; Update value for TENAB
033B C34303               JMP     MR33
033E D613        MR31:    SUI     DC3
0340 C24603               JNZ     MR35            ; Branch if not DC3
0343 322B70      MR33:    STA     TENAB           ; Update transmit enable status
0346 CDC602      MR35:    CALL    PARAM1          ; Set up parameters for Motor 1
0349 CD8B03               CALL    MOTOR           ;RUN MOTOR 1
034C CDF904               CALL    ERRCT
034F E604                 ANI     SOUT
0351 CA5903               JZ      MR4
0354 3E40                 MVI     A,OUTST1
0356 CD8103               CALL    DOMOT           ;SET STAMP OUT LED

0359 CDDC02      MR4:     CALL    PARAM2          ; Set up paramaeters for Motor 2
035C CD8B03               CALL    MOTOR           ;RUN MOTOR 2
035F CDF904               CALL    ERRCT
0362 E604                 ANI     SOUT
0364 CA6C03               JZ      MR5
0367 3E80                 MVI     A,OUTST2
0369 CD8103               CALL    DOMOT           ;SET STAMP OUT LED

036C CDF202      MR5:     CALL    PARAM3          ; Set up parameters for Motor 3
036F CD8B03               CALL    MOTOR           ;RUN MOTOR 3
0372 CDF904               CALL    ERRCT
0375 E604                 ANI     SOUT
0377 CA0803               JZ      MRUN
037A 3E01                 MVI     A,OUTST3
037C D373                 OUT     PORTC           ;SET STAMP OUT LED
037E C30803               JMP     MRUN            ;CONTINUE LOOP
0381 212470      DOMOT:   LXI     H,MOUT
0384 B6                   ORA     M
0385 77                   MOV     M,A

                          IF      SN7407
0386 EE3F                 XRI     3FH
                          ENDIF

0388 D372                 OUT     PORTB
038A C9                   RET


                 ;THE FOLLOWING ROUTINE IS A GENERAL PURPOSE MOTOR CONTROL ROUTINE
                 ;THE ADDRESS OF THE CURRENT MOTORS STATE TABLE SHOULD BE IN RAMPTR,
                 ;MENCD MUST CONTAIN THE BIT POSITION OF THE CURRENT MOTOR'S ENCODER INPUT
                 ;SBIT MUST CONTAIN THE BIT POSITION OF THE CURRENT MOTOR'S STAMP SENSOR INPUT
                 ;AND MBIT MUST CONTAIN THE BIT WHICH IS USED TO CONTROL THE CURRENT
                 ;MOTOR'S TRIAC.

038B 2A2570      MOTOR:   LHLD    RAMPTR          ;STATE TABLE POINTER
038E 7E                   MOV     A,M             ;GET CURRENT STATE
038F FE00                 CPI     NOACT           ;SEE IF NOT USED
0391 CAC003               JZ      RDELAY
0394 FE06                 CPI     NAVAIL          ;EXIT IF NOT USED EITHER
0396 CAC003               JZ      RDELAY
0399 CDC603               CALL    ROUTIN          ;HANDLE CURRENT STATE
039C C8                   RZ                      ;DONE IF NEW STATE FOUND
039D CDB203               CALL    TIMOUT          ; Decrement timer
03A0 C0                   RNZ                     ;DONE IF NO TIMEOUT
03A1 2B                   DCX     H
03A2 7E                   MOV     A,M             ; Get status byte
03A3 FE05                 CPI     MTOFF
03A5 CAB104               JZ      OFFTIM          ; Branch if motor off time-out
03A8 3E02                 MVI     A,MOFF
03AA CD1005               CALL    SETERR          ;SET MOTOR NOT FUNCTIONAL ERROR
03AD 3E06                 MVI     A,NAVAIL        ;MOTOR NOT AVAILABLE STATE
03AF C3BE04               JMP     MDON1           ;JUMP TO TURN OFF MOTOR

                 ; Routine to decrement TIMOT value of current motor and test for zero

03B2 2A2570      TIMOUT:  LHLD    RAMPTR
03B5 23                   INX     H               ;POINT AT CURRENT TIME
03B6 4E                   MOV     C,M
03B7 23                   INX     H               ;AND LOAD IT
03B8 46                   MOV     B,M
03B9 0B                   DCX     B
03BA 70                   MOV     M,B             ;AND PUT IT BACK
03BB 2B                   DCX     H
03BC 71                   MOV     M,C
03BD 78                   MOV     A,B             ;CHECK TIME
03BE B1                   ORA     C
03BF C9                   RET
```

```
03C0 210600   RDELAY: LXI    H,6        ; An attempt to equalize loop times under
03C3 C3A101           JMP    WAIT       ;   different operating conditions

03C6 210403   ROUTIN: LXI    H,STABL    ;POINT AT STATE TABLE
03C9 3D               DCR    A
03CA 07               RLC
03CB 4F               MOV    C,A        ;PUT OFFSET INTO BC
03CC 0600             MVI    B,0
03CE 09               DAD    B          ;POINT AT ROUTINE ADDRESS
03CF 5E               MOV    E,M        ;GET ADDRESS
03D0 23               INX    H
03D1 56               MOV    D,M
03D2 EB               XCHG
03D3 E9               PCHL              ;GO EXECUTE IT

03D4 DF03     STABL:  DW     MONIL      ;MOTOR STATE ROUTINES
03D6 F403             DW     MOLTDK
03D8 4D04             DW     MODKLT
03DA 5904             DW     MOEND
03DC DE03             DW     OFWAIT     ; Just wait for timer to expire

03DE C9       OFWAIT: RET


              ;ROUTINE TO HANDLE MOTOR TURN ON TO ENCODER GOES LIGHT STATE

03DF CDDB04   MONIL:  CALL   ENCTST     ; Motor encoder light or dark?
03E2 C0               RNZ               ; Return if still dark
03E3 2A2570           LHLD   RAMPTR
03E6 110A00           LXI    D,PERFF
03E9 19               DAD    D
03EA 3600             MVI    M,0        ; Clear perf detected flag
03EC 11DA07           LXI    D,M2TIM    ;NEXT TIMEOUT VALUE
03EF 3E02             MVI    A,FLTDK
03F1 C3EC04           JMP    STSTAT



03F4 CDDB04   MOLTDK: CALL   ENCTST     ; Motor encoder light or dark?
03F7 C20D04           JNZ    MOLTD1     ; Branch if now dark
03FA CDE404           CALL   SNSTST     ; Test stamp sensor bit
03FD CA0904           JZ     MOLTD0     ; Branch if no perfs
0400 2A2570           LHLD   RAMPTR
0403 010A00           LXI    B,PERFF
0406 09               DAD    B
0407 3601             MVI    M,1        ; Set perf detected flag
0409 3E01     MOLTD0: MVI    A,1
040B A7               ANA    A
040C C9               RET

040D 2A2570   MOLTD1: LHLD   RAMPTR
0410 010A00           LXI    B,PERFF
0413 09               DAD    B
0414 7E               MOV    A,M
0415 A7               ANA    A          ; Test perf detected flag
0416 C24504           JNZ    MOLTD3     ; Branch if we saw the perfs
0419 3A2370           LDA    SBIT
041C 47               MOV    B,A        ; SBIT to B
041D 3A2770           LDA    FTEST
0420 A0               ANA    B
0421 C23304           JNZ    MOLT15     ; Branch if re-orienting roll
0424 78               MOV    A,B
0425 07               RLC
0426 07               RLC
0427 07               RLC
0428 07               RLC               ; Use hi nibble of FTEST for 2nd try
0429 47               MOV    B,A
042A 3A2770           LDA    FTEST
042D A0               ANA    B
042E 3E01             MVI    A,SJAM     ;STAMP JAM ERROR
0430 CA4204           JZ     MOLTD2     ; Branch on stamp jam
0433 3A2770   MOLT15: LDA    FTEST
0436 A8               XRA    B
0437 322770           STA    FTEST      ; Clear TEST flag
043A 3E01             MVI    A,ONTLT    ; Set up to go an extra half stamp
043C 11D807           LXI    D,M1TIM
043F C3EC04           JMP    STSTAT
0442 CD1005   MOLTD2: CALL   SETERR     ; Set the error
0445 3E03     MOLTD3: MVI    A,DKLT     ;NEXT MOTOR STATE
0447 11DC07           LXI    D,M3TIM    ;SET NEXT TIMEOUT
044A C3EC04           JMP    STSTAT     ;SET THE MOTOR TO NEXT STATE

044D CDDB04   MODKLT: CALL   ENCTST     ; Motor encoder light or dark?
0450 C0               RNZ               ; Return if now light
0451 11DE07           LXI    D,M4TIM    ;NEXT TIMEOUT VALUE
0454 3E04             MVI    A,SLTDK    ;NEXT STATE
0456 C3EC04           JMP    STSTAT     ;SET THE NEXT STATE

0459 CDDB04   MOEND:  CALL   ENCTST     ; Motor encoder light or dark?
045C CA0904           JZ     MOLTD0     ; Branch if still light
045F 2A2570           LHLD   RAMPTR
0462 010800           LXI    B,OOSCNT
0465 09               DAD    B          ; Point at out-of-stamp count
0466 CDE404           CALL   SNSTST     ; Test stamp sensor bit
```

```
0469 3E00               MVI    A,0
046B CA7E04             JZ     MOEN1          ; Branch if stamp present
046E 7E                 MOV    A,M            ; Get OOSCNT
046F A7                 ANA    A
0470 3E04               MVI    A,4
0472 CA7E04             JZ     MOEN1          ; Branch if first detection of stamp out
0475 35                 DCR    M              ; Have 4 stamps been fed since stamp last seen?
0476 3E04               MVI    A,SOUT
0478 CC1005             CZ     SETERR         ; Set stamp error if OOSCNT counted down to 0
047B C37F04             JMP    MOEN15
047E 77        MOEN1:   MOV    M,A            ; Reset or Initialize OOSCNT
047F 2A2570    MOEN15:  LHLD   RAMPTR
0482 110500             LXI    D,STFD
0485 19                 DAD    D
0486 4E                 MOV    C,M            ;GET STAMP COUNT SO FAR
0487 23                 INX    H
0488 46                 MOV    B,M
0489 03                 INX    B              ;INCREMENT STAMP COUNT
048A 70                 MOV    M,B            ;PUT BACK COUNT
048B 2B                 DCX    H
048C 71                 MOV    M,C
048D 2B                 DCX    H
048E 7E                 MOV    A,M            ;GET TOTAL TO FEED
048F B8                 CMP    B
0490 C29904             JNZ    MOEN2          ;JUMP IF NOT DONE YET
0493 2B                 DCX    H
0494 7E                 MOV    A,M
0495 B9                 CMP    C              ;CHECK IF DONE
0496 CAA904             JZ     MDONE          ;JUMP IF DONE

0499 CDC102    MOEN2:   CALL   COVCHK         ;CHECK IF COVER OPEN
049C CAA304             JZ     MOEN3          ;JUMP IF OK
049F AF                 XRA    A              ;SET ZERO FLAG
04A0 C3A904             JMP    MDONE          ;FINISH UP MOTOR
04A3 CDF904    MOEN3:   CALL   ERRGT          ;GET ERROR STATUS
04A6 CAD304             JZ     DOMOR          ;JUMP IF NO MOTOR ERROR

               ; Get here when all stamps for a motor have been dispensed (or an error
               ; condition has occurred)

04A9 11E007    MDONE:   LXI    D,M5TIM        ; Motor off delay time
04AC 3E05               MVI    A,MTOFF        ; Next state
04AE C3EC04             JMP    STSTAT

               ;REACH HERE WHEN SHUTTING OFF A MOTOR

04B1 11E207    OFFTIM:  LXI    D,M6TIM        ; Clear timer value
04B4 CDF904             CALL   ERRGT          ; Get error status
04B7 3E00               MVI    A,NOACT
04B9 CABE04             JZ     MDON1          ;JUMP IF NO ERROR
04BC 3E06               MVI    A,NAVAIL       ;SET MOTOR NOT AVAILABLE
04BE CDEC04    MDON1:   CALL   STSTAT         ;SET NEW STATE
04C1 3A2170             LDA    MBIT           ;GET MOTOR CONTROL BIT
04C4 2F                 CMA
04C5 47                 MOV    B,A            ;PUT COMPLEMENT IN B
04C6 3A2470             LDA    MOUT           ;MOTOR OUTPUT PORT
04C9 A0                 ANA    B              ;CLEAR CURRENT MOTOR BIT
04CA 322470             STA    MOUT

                        IF     SN7407
04CD EE3F               XRI    3FH
                        ENDIF

04CF D372               OUT    PORTB          ;OUTPUT IT
04D1 AF                 XRA    A
04D2 C9                 RET

               ;REACH HERE IF MORE STAMPS TO DISPENSE
04D3 11D807    DOMOR:   LXI    D,M1TIM        ;FIRST TIMEOUT VALUE
04D6 3E01               MVI    A,ONILT        ;INITIAL STATE
04D8 C3EC04             JMP    STSTAT         ;CONTINUE DISPENSING

               ; Routine to sample a motor encoder sensor.  Returns w/zero flag set
               ; if light is detected, else zero flag reset

04DB 3A2270    ENCTST:  LDA    MENCD
04DE 47                 MOV    B,A
04DF DB71               IN     PORTA
04E1 A0                 ANA    B              ; See if this motor's encoder is on
04E2 90                 SUB    B
04E3 C9                 RET


               ; Routine to sample a stamp roll perferation sensor.  Returns w/zero flag
               ; set if light is not detected (stamp is present), else zero flag reset

04E4 3A2370    SNSTST:  LDA    SBIT
04E7 47                 MOV    B,A
04E8 DB71               IN     PORTA
04EA A0                 ANA    B              ; See if there's a stamp in there
04EB C9                 RET

               ;ROUTINE TO SET THE NEXT STATE FOR A MOTOR
               ;INPUT: RAMPTR MUST CONTAIN POINTER TO CURRENT MOTOR STATE TABLE
```

```
                     ;         DE CONTAINS NEXT TIMEOUT VALUE
                     ;         A CONTAINS NEXT STATE
04EC 2A2570          STSTAT:   LHLD    RAMPTR          ;TABLE POINTER
04EF 77                        MOV     M,A             ;SET NEW STATE
04F0 23                        INX     H               ;POINT TO TIMEOUT VALUE
04F1 1A                        LDAX    D
04F2 77                        MOV     M,A             ;SAVE NEW VALUE
04F3 23                        INX     H
04F4 13                        INX     D
04F5 1A                        LDAX    D
04F6 77                        MOV     M,A
04F7 AF                        XRA     A               ;SET ZERO RETURN
04F8 C9                        RET
                     ;ROUTINE TO GET ERROR STATUS FOR A MOTOR AND SET FLAGS
04F9 2A2570          ERRGT:    LHLD    RAMPTR          ;STATE TABLE POINTER
04FC 010700          ERRG1:    LXI     B,ERRST         ;OFFSET TO ERROR STATUS
04FF 09              ERRG2:    DAD     B
0500 7E                        MOV     A,M
0501 A7                        ANA     A
0502 C9                        RET
                     ; Routine to get error status only if motor was commanded to move
0503 010900          CERRGT:   LXI     B,MCMND
0506 09                        DAD     B
0507 7E                        MOV     A,M
0508 A7                        ANA     A
0509 C8                        RZ                      ; Return w/zero if motor not commanded
050A 01FEFF                    LXI     B,ERRST-MCMND   ; Offset to error status
050D C3FF04                    JMP     ERRG2           ; Share code
                     ;ROUTINE TO SET ERROR FOR A MOTOR
0510 2A2570          SETERR:   LHLD    RAMPTR          ;STATE TABLE POINTER
0513 010700                    LXI     B,ERRST         ;OFFSET TO ERROR
0516 09                        DAD     B
0517 B6                        ORA     M
0518 77                        MOV     M,A             ;SET ERROR BIT
0519 C9                        RET
                     ;THIS ROUTINE WILL DECODE THE INPUT BUFFER, AND THEN SET THE STATE
                     ;TABLE OF EACH MOTOR TO REFLECT THE CURRENT DISPENSE COMMAND.
051A 012E70          DECOD:    LXI     B,RSBUF+2       ;POINT AT CONTROL BYTE (XCW)
051D 0A                        LDAX    B               ;GET BACK BYTE
051E E60E                      ANI     0EH             ;ISOLATE MESSAGE BITS (MS)
0520 CA3505                    JZ      MSGOK           ;JUMP IF ACK OF LAST MESSAGE
0523 FE0E                      CPI     0EH
0525 CA9605                    JZ      BADMSG          ; Retransmit if ECC error
0528 FE06                      CPI     6
052A CA4705                    JZ      CHKSC
052D FE0A                      CPI     0AH             ; If Illegal Message or Format Error status,
052F CA4705                    JZ      CHKSC           ;    go on to check SC bits
0532 C35C05                    JMP     ILLMSG          ; Else, it's an illegal message
0535 210070          MSGOK:    LXI     H,M1TAB
0538 CD3B06                    CALL    ZSF             ; Zero STFD and MCMND for Motor 1
053B 210B70                    LXI     H,M2TAB
053E CD3B06                    CALL    ZSF             ;    and Motor 2
0541 211670                    LXI     H,M3TAB
0544 CD3B06                    CALL    ZSF             ;    and Motor 3
0547 0A              CHKSC:    LDAX    B
0548 E631                      ANI     31H             ;CHECK MSG TYPE (MT) AND SUPERVISORY BITS (SC)
054A FE01                      CPI     1
054C CA9D05                    JZ      DTEXT           ;JUMP IF MESSAGE
054F 0A                        LDAX    B
0550 E630                      ANI     30H             ;ISOLATE CONTROL BITS (SC)
0552 FE10                      CPI     10H
0554 CA8405                    JZ      RESET           ;JUMP IF RESET COMMAND
0557 FE30                      CPI     30H
0559 CA6505                    JZ      LOOPBK          ; Branch if loopback request
055C 3E06            ILLMSG:   MVI     A,BADXCW
055E CDA801                    CALL    OUTST           ; Send illegal message status if XCW no good
0561 E1                        POP     H
0562 C36300                    JMP     LOOP
0565 3E33            LOOPBK:   MVI     A,33H
0567 322F70                    STA     RSBUF+3         ; Replace their I.D. w/ our I.D.
056A 214A70                    LXI     H,OUTBUF
056D 112C70                    LXI     D,RSBUF
0570 3A2D70                    LDA     RSBUF+1         ; Get received VLI
0573 3C                        INR     A               ; Bump for STX byte
0574 47                        MOV     B,A             ; Message length to B
0575 1A              LPBKMV:   LDAX    D               ; Get received character
0576 77                        MOV     M,A             ; Put in xmitter buffer
0577 13                        INX     D
0578 23                        INX     H
0579 05                        DCR     B
```

```
057A C27505          JNZ    LPBKMV         ; Move the whole thing
057D CD4402          CALL   STSEND         ; Send it back
0580 E1              POP    H              ;CLEAR CALL FROM STACK
0581 C36300          JMP    LOOP           ;GO BACK FOR MORE

0584 3E00     RESET: MVI    A,FUNCOK
0586 CDA801          CALL   OUTST          ;OUTPUT MESSAGE OK
0589 210020          LXI    H,2000H
058C CDA101          CALL   WAIT           ; Wait fokr XMITTER to empty
058F 3E40            MVI    A,40H          ;RESET UART
0591 D310            OUT    PORTRS
0593 C30000          JMP    BEGIN          ;GO BACK TO START


              ;REACH HERE IF GOT A NAK OF LAST MESSAGE

0596 CD4602   BADMSG: CALL  STS0           ;RETRANSMIT LAST MESSAGE
0599 E1              POP    H              ;CLEAR STACK OF CALL
059A C36300          JMP    LOOP

              ;REACH HERE IF TEXT TO INTERPRET

059D 013070   DTEXT: LXI    B,RSBUF+4      ;POINT AT FUNCTION BYTE
05A0 0A              LDAX   B
05A1 FE03            CPI    3
05A3 CA5106          JZ     RDIAG          ; Jump if reorientation diagnostic
05A6 FE02            CPI    2              ;CHECK FOR EXERCISE DIAG
05A8 CA5D06          JZ     DIAG           ;JUMP IF EXERCISE DIAG
05AB FE01            CPI    1
05AD C25C05          JNZ    ILLMSG         ; Branch on illegal XCH

              ; Get here to decode a dispense command

05B0 03              INX    B              ;POINT AT FIRST STAMP COMMAND
05B1 CDC602          CALL   PARAM1         ;SET POINTER TO MOTOR 1
05B4 CDC005          CALL   VLGET          ;GET STAMPS TO DISPENSE
05B7 CDDC02          CALL   PARAM2         ;SETUP MOTOR 2
05BA CDC005          CALL   VLGET
05BD CDF202          CALL   PARAM3         ;NOW DO MOTOR 3

              ;ROUTINE TO DECODE THE STAMPS TO DISPENSE AND SET THE APPROPRIATE
              ;VALUES FOR THE CURRENT MOTOR

05C0 0A       VLGET: LDAX   B              ;GET HUNDREDS DIGIT OF COUNT
05C1 D62F            SUI    2FH            ;GET INTEGER + 1
05C3 210000          LXI    H,0            ;INIT COUNT
05C6 116400          LXI    D,100
05C9 CD4B06          CALL   MULT           ;CONVERT TO BINARY IN HL
05CC 03              INX    B              ;NEXT DIGIT
05CD 0A              LDAX   B
05CE D62F            SUI    2FH            ;GET INTEGER + 1
05D0 110A00          LXI    D,10           ;NOW CONVERT TEN'S DIGIT TO BINARY
05D3 CD4B06          CALL   MULT           ;AND SUM IN TO COUNT
05D6 03              INX    B              ;NEXT DIGIT
05D7 0A              LDAX   B
05D8 D630            SUI    30H
05DA 03              INX    B              ;SET POINTER FOR NEXT MOTOR
05DB 5F              MOV    E,A            ;PUT UNITS IN DE
05DC 1600            MVI    D,0
05DE 19              DAD    D              ;ADD UNITS TO COUNT SO FAR
05DF 7C              MOV    A,H
05E0 B5              ORA    L              ;CHECK IF ANY STAMPS TO DISPENSE
05E1 C8              RZ                    ;DONE IF COUNT WAS 0

05E2 EB              XCHG                  ;GET COUNT IN DE
05E3 2A2570          LHLD   RAMPTR         ;POINTER TO CURRENT MOTOR STATE TABLE
05E6 7E              MOV    A,M            ;GET CURRENT STATUS
05E7 FE00            CPI    NOACT          ;CHECK FOR NOT ACTIVE
05E9 C21306          JNZ    VLG2           ;BRANCH IF ANYTHING BUT NOT ACTIVE
05EC C5              PUSH   B
05ED CDDB04          CALL   ENCTST
05F0 CA2A06          JZ     ENCERR         ; Branch if the encoder is out of position
05F3 CDE404          CALL   SNSTST
05F6 CA0406          JZ     VLG0           ; Branch if stamp sensor sees no light
05F9 E5              PUSH   H
05FA 010800          LXI    B,OOSCNT
05FD 09              DAD    B
05FE 7E              MOV    A,M
05FF A7              ANA    A              ; Have we previously detected end of roll?
0600 E1              POP    H
0601 CA2F06          JZ     SNSERR         ; Branch if sensor error
0604 C1       VLG0:  POP    B
0605 3601     VLG1:  MVI    M,ONTLT        ;SET MOTOR TO FIRST STATE
0607 23              INX    H
0608 D5              PUSH   D              ;SAVE STAMP COUNT
0609 11D807          LXI    D,M1TIM        ;FIRST MOTOR TIMEOUT VALUE
060C 1A              LDAX   D
060D 77              MOV    M,A            ;PUT IN MOTOR STATE TABLE
060E 13              INX    D
060F 23              INX    H
0610 1A              LDAX   D
0611 77              MOV    M,A
0612 D1              POP    D
0613 D5       VLG2:  PUSH   D
```

```
0614 2A2570             LHLD    RAMPTR
0617 110300             LXI     D,STOFD
061A 19                 DAD     D                ;SET POINTER TO STAMPS TO FEED VALUE
061B D1                 POP     D                ;GET BACK STAMP COUNT
061C 73                 MOV     M,E              ;SET STAMP COUNT IN STATE TABLE
061D 23                 INX     H
061E 72                 MOV     M,D
061F D5                 PUSH    D
0620 2A2570             LHLD    RAMPTR
0623 CD3B06             CALL    ZSF              ; Zero STFD
0626 D1                 POP     D
0627 3601               MVI     M,1              ; Set motor commanded flag true
0629 C9                 RET

     ; Get here if we're trying to start off on the wrong foot

062A 3E02       ENCERR: MVI     A,MOFF
062C C33106             JMP     STRTER
062F 3E04       SNSERR: MVI     A,SOUT
0631 CD1005     STRTER: CALL    SETERR           ; Set error condition
0634 C1                 POP     B                ; Restore BC
0635 2A2570             LHLD    RAMPTR
0638 3606               MVI     M,NAVAIL         ; Motor becomes unavailable
063A C9                 RET

     ; A little routine to zero STFD and MCMND

063B 110500     ZSF:    LXI     D,STFD
063E 19                 DAD     D
063F 3600               MVI     M,0              ;SET COUNT SO FAR TO 0
0641 23                 INX     H
0642 3600               MVI     M,0
0644 110300             LXI     D,MCMND-STFD-1
0647 19                 DAD     D
0648 3600               MVI     M,0              ; Clear motor commanded flag
064A C9                 RET

     ;THIS ROUTINE MULTIPLIES THE NUMBER IN DE BY THE VALUE IN A
     ;AND SUMS IT WITH THE VALUE IN HL.
     ;RESULT IN HL.

064B 3D         MULT:   DCR     A                ;CHECK IF DONE
064C C8                 RZ                       ;RETURN IF YES
064D 19                 DAD     D                ;DO ONE SUM
064E C34B06             JMP     MULT             ;GO BACK FOR MORE

     ; Reach here if reorientation diagnostic selected

0651 CD6307     RDIAG:  CALL    SETFUL           ; Prepare regs for reorienting feed
0654 CD6806             CALL    GOBACK           ; Back up first
0657 3EFF               MVI     A,0FFH
0659 [illegible]        STA     [illegible]      ; Allow for reorientation
065C C9                 RET                      ; Return to feed forward

     ;REACH HERE IF DIAG SELECTED

065D 21DC07     DIAG:   LXI     H,M3TIM
0660 222970             SHLD    NXTTIM
0663 3E03               MVI     A,DKLT           ; Prepare regs for 1/2 stamp feed
0665 322870             STA     NXTST

     ; Fall thru to back up, returning to main loop to feed forward 1/2 stamp

0668 110100     GOBACK: LXI     D,1              ;INIT STAMP COUNT
066B 03                 INX     B                ;POINT AT FIRST VALUE
066C 0A                 LDAX    B
066D D630               SUI     30H              ;MAKE AN INTEGER
066F CA7F06             JZ      GOBK01           ; Branch if not selected
0672 3D                 DCR     A
0673 C2BC00             JNZ     FMTERR           ; Format error if not ASCII 0 or 1
0676 210070             LXI     H,M1TAB          ;SET POINTER TO MOTOR 1
0679 222570             SHLD    RAMPTR
067C CD0506             CALL    VLG1             ;SETUP MOTOR TO RUN
067F 03         GOBK01: INX     B                ;POINT AT NEXT VALUE
0680 0A                 LDAX    B
0681 D630               SUI     30H              ;MAKE AN INTEGER
0683 CA9306             JZ      GOBK02
0686 3D                 DCR     A
0687 C2BC00             JNZ     FMTERR
068A 210B70             LXI     H,M2TAB          ;SETUP MOTOR 2
068D 222570             SHLD    RAMPTR
0690 CD0506             CALL    VLG1
0693 03         GOBK02: INX     B                ;POINT AT NEXT VALUE
0694 0A                 LDAX    B
0695 D630               SUI     30H              ;MAKE AN INTEGER
0697 CAA706             JZ      GOBK03
069A 3D                 DCR     A
069B C2BC00             JNZ     FMTERR
069E 211670             LXI     H,M3TAB          ;NOW DO MOTOR 3
06A1 222570             SHLD    RAMPTR
06A4 CD0506             CALL    VLG1
```

```
06A7 CDC602     GOBK03: CALL    PARAM1          ; Set Motor 1 parameters
06AA CDBF06             CALL    BAKOFF          ; Try to clear JAM
06AD CDDC02             CALL    PARAM2
06B0 CDBF06             CALL    BAKOFF          ; Now do motor 2
06B3 CDF202             CALL    PARAM3
06B6 CDBF06             CALL    BAKOFF          ; And motor 3
06B9 210020             LXI     H,REVTIM        ; DELAY before returning to feed forward
06BC C3A101             JMP     WAIT

                ; A routine to drive a motor backwards for a while

06BF 7E         BAKOFF: MOV     A,M
06C0 FE01               CPI     ONTLT
06C2 C0                 RNZ                     ; Don't bother if not requested
06C3 3A2170             LDA     MBIT
06C6 87                 ADD     A
06C7 322170             STA     MBIT
06CA CD8103             CALL    DOMOT           ; Turn on reverse motor winding
06CD 216400     DIAG1:  LXI     H,100
06D0 CDA101             CALL    WAIT            ; Delay to equalize timeout values
06D3 2A2570             LHLD    RAMPTR
06D6 7E                 MOV     A,M
06D7 FE03               CPI     DKLT
06D9 CAE806             JZ      DIAG2           ; Branch if encoder has made proper transitions
06DC CDC603             CALL    ROUTIN          ; One pass thru control program
06DF CD8203             CALL    TIMOUT
06E2 CA0807             JZ      STALL           ; Branch if motor is stalled
06E5 C3CD06             JMP     DIAG1           ; Loop til something happens
06E8 010700     DIAG2:  LXI     B,ERRST
06EB 09                 DAD     B
06EC 3600               MVI     M,0             ; Clear any error
06EE 010100             LXI     B,OOSCNT-ERRST
06F1 09                 DAD     B
06F2 7E                 MOV     A,M
06F3 A7                 ANA     A
06F4 CAF806             JZ      DIAG3
06F7 34                 INR     M               ; Inc OOSCNT if we're counting stamps left
06F8 210001     DIAG3:  LXI     H,100H
06FB CDA101             CALL    WAIT            ; Go past the edge a bit
06FE 2A2970             LHLD    NXTTIM
0701 EB                 XCHG
0702 3A2870             LDA     NXTST           ; Get next state and associated timeout value
0705 C3BE04             JMP     MDON1           ; Turn off the motor, etc

0708 3E02       STALL:  MVI     A,MOFF
070A CD1005             CALL    SETERR          ; Set motor jam error status
070D C3B104             JMP     OFFTIM          ; Turn off the motor


                ; Test routine activated when test button is depressed
                ;       1) Sequentially move each motor back 1 rev
                ;       2) Feed all 3 rolls forward one stamp
                ;       3) RS-232 local loop-back test
                ;       4) Out-of-stamp indicator test
                ;
                ;       If an error occurs, an error code is displayed on the out-of-stamp
                ;         indicators and the processor is halted


0710 01D407     TEST:   LXI     B,TSTMSG-1
0713 CD6307             CALL    SETFUL          ; Set regs for reorienting feed forward
0716 CD6806             CALL    GOBACK          ; Feed rolls backwards (sequentially)
0719 CD6F07             CALL    ETEST           ; CHECK FOR ERRORS
071C 210020             LXI     H,REVTIM        ; DELAY
071F CDA101             CALL    WAIT            ;
0722 3EFF               MVI     A,0FFH          ;
0724 322770             STA     FTEST           ; SET TEST FLAGS
0727 CDE800             CALL    MOTON           ; FEED ROLLS FWD SIMULTANEOUSLY
072A CD6F07             CALL    ETEST           ;
072D DB10               IN      PORTRS
072F E685               ANI     85H
0731 FE85               CPI     85H
0733 0640               MVI     B,RSERR1
0735 C29B07             JNZ     TSTERR          ; Get lost if RS-232 status is NG
0738 0E55               MVI     C,55H
073A CD6A01             CALL    OUTCHR          ; Send a char
073D 21DC00             LXI     H,220           ; Set delay to a little over 1 char time @2400
0740 CD6501     TEST0:  CALL    INSTAT
0743 C25107             JNZ     TEST1           ; Branch if we get a character
0746 2B                 DCX     H
0747 7C                 MOV     A,H
0748 B5                 ORA     L
0749 C24007             JNZ     TEST0           ; Branch til delay expires
074C 0680               MVI     B,RSERR2
074E C39B07             JMP     TSTERR          ; Get lost if no char in time
0751 3A0010     TEST1:  LDA     RSDATA
0754 FE55               CPI     55H             ; Was char received same as char sent??
0756 06C0               MVI     B,RSERR3
0758 C29B07             JNZ     TSTERR          ; Get lost if wrong character
075B 06C1               MVI     B,TSTCOD
075D CDAA07             CALL    FLASH           ; Flash the stamp out indicators
0760 C3E100             JMP     L3
```

```
0763 21D807      SETFUL: LXI     H,M1TIM
0766 222970              SHLD    NXTTIM
0769 3E01                MVI     A,ONTLT
076B 322870              STA     NXTST          ; Prepare to feed forward up to 1.5 stamps
076E C9                  RET

                 ; This routine test each motor state. If NAVAIL, appropriate out-of-stamp
                 ; indicators are lit

076F 0600        ETEST:  MVI     B,0
0771 3A0070              LDA     M1TAB
0774 FE06                CPI     NAVAIL
0776 C27D07              JNZ     ET1            ; Branch if Motor 1 ok
0779 3E40                MVI     A,OUTST1
077B B0                  ORA     B
077C 47                  MOV     B,A
077D 3A0B70      ET1:    LDA     M2TAB
0780 FE06                CPI     NAVAIL
0782 C28907              JNZ     ET2            ; Branch if Motor 2 ok
0785 3E80                MVI     A,OUTST2
0787 B0                  ORA     B
0788 47                  MOV     B,A
0789 3A1670      ET2:    LDA     M3TAB
078C FE06                CPI     NAVAIL
078E C29507              JNZ     ET3            ; Branch if Motor 3 ok
0791 3E01                MVI     A,OUTST3
0793 B0                  ORA     B
0794 47                  MOV     B,A
0795 78          ET3:    MOV     A,B
0796 A7                  ANA     A
0797 C2A407              JNZ     MOTERR         ; Get lost if motor error
079A C9                  RET

                 ; This routine flashes a test error code on the out-of-stamp indicators
                 ; forever

079B 110040      TSTERR: LXI     D,4000H        ; Slow rate
079E CDAD07              CALL    FLASHR
07A1 C39B07              JMP     TSTERR

07A4 CDAA07      MOTERR: CALL    FLASH
07A7 C3A407              JMP     MOTERR

07AA 110020      FLASH:  LXI     D,2000H        ; Fast rate
07AD 0E05        FLASHR: MVI     C,5            ; Gonna flash 5 times
07AF 78          FLASH1: MOV     A,B
07B0 E601                ANI     1
07B2 D373                OUT     PORTC
07B4 78                  MOV     A,B
07B5 E6C0                ANI     0C0H           ; Turn selected lights on

                         IF      SN7407
07B7 EE3F                XRI     3FH
                         ENDIF

07B9 D372                OUT     PORTB
07BB 62                  MOV     H,D
07BC 6B                  MOV     L,E            ; Load flash rate
07BD CDA101              CALL    WAIT
07C0 AF                  XRA     A
07C1 D373                OUT     PORTC          ; Turn 'em off

                         IF      SN7407
07C3 EE3F                XRI     3FH
                         ENDIF

07C5 D372                OUT     PORTB
07C7 62                  MOV     H,D
07C8 6B                  MOV     L,E
07C9 CDA101              CALL    WAIT
07CC 0D                  DCR     C
07CD C2AF07              JNZ     FLASH1
07D0 C9                  RET

07D1 02          NULMSG: DB      2,2,0,3        ; Fake ACK status message
07D2 02
07D3 00
07D4 03
07D5 313131      TSTMSG: DB      '111'          ; Fake diagnostic string

                 ;TIMEOUT VALUES FOR EACH STATE

07D8 0001        M1TIM:  DW      100H
07DA 0002        M2TIM:  DW      200H
07DC 0001        M3TIM:  DW      100H
07DE 0002        M4TIM:  DW      200H
07E0 2400        M5TIM:  DW      36
07E2 0000        M6TIM:  DW      0

07E4 0F          CHKSUM: DB      00FH           ; So sum of bytes from BEGIN to here = 00

                         END
```

PUBLIC SYMBOLS

EXTERNAL SYMBOLS

ISIS-II 8080/8085 MACRO ASSEMBLER, V3.0 MODULE PAGE 27

USER SYMBOLS

| | | | | | | |
|---|---|---|---|---|---|---|
| BADECC A 000E | BADFMT A 000A | BADMSG A 0596 | BADXCH A 0006 | BAKOFF A 068F | BEGIN A 0000 | BID1 A 02AB |
| BID2 A 02AD | CERRGT A 0503 | CHKSC A 0547 | CHKSUM A 07E4 | COV1 A 0220 | COVBT A 0080 | COVCHK A 0201 |
| COVOP A 021E | DC1 A 0011 | DC3 A 0013 | DECOD A 051A | DIAG A 065D | DIAG1 A 06CD | DIAG2 A 06EB |
| DIAG3 A 06FB | DKLT A 0003 | DOMOR A 04D3 | DOMOT A 0381 | DONUL A 005B | DTEXT A 059D | ENCEPR A 062A |
| ENCTST A 040B | ERRG1 A 04FC | ERRG2 A 04FF | ERRGT A 04F9 | ERRLNG A 0010 | ERRST A 0007 | ET1 A 077D |
| ET2 A 0789 | ET3 A 0795 | ETEST A 076E | ETX A 0003 | FALSE A 0000 | FLASH A 07AA | FLASH1 A 07AF |
| FLASHR A 07AD | FLTDK A 0002 | FMTERR A 00BC | FTEST A 7027 | FUNCOK A 0000 | GOBACK A 066B | GOBK01 A 067F |
| GOBK02 A 0693 | GOBK03 A 06A7 | ILLMSG A 055C | INCHAR A 015B | INSTAT A 0165 | INH1 A 017B | INH2 A 0183 |
| INHAIT A 0176 | L001 A 007E | L002 A 008E | L003 A 009D | L01 A 00C9 | L03 A 00C6 | L1 A 00CC |
| L2 A 00DE | L3 A 00E1 | LOOP A 0063 | LOOPBK A 0565 | LPBKMV A 0575 | M1BIT A 0001 | M1ENCD A 0008 |
| M1TAB A 7000 | M1TIM A 07D8 | M2BIT A 0004 | M2ENCD A 0010 | M2TAB A 700B | M2TIM A 07DA | M3BIT A 0010 |
| M3ENCD A 0020 | M3TAB A 7016 | M3TIM A 07DC | M4TIM A 07DE | M5TIM A 07E0 | M6TIM A 07E2 | MBIT A 7021 |
| MCMND A 0009 | MDON1 A 04BE | MDONE A 04A9 | MENCD A 7022 | MODKLT A 044D | MOEN1 A 047E | MOEN15 A 047F |
| MOEN2 A 0499 | MOEN3 A 04A3 | MOEND A 0459 | MOFF A 0002 | MOLT15 A 0433 | MOLTD0 A 0409 | MOLTD1 A 040D |
| MOLTD2 A 0442 | MOLTD3 A 0445 | MOLTDK A 03F4 | MONIL A 03DE | MOTERR A 07A9 | MOTON A 00EB | MOTOR A 038B |
| MOUT A 7024 | MR1 A 0315 | MR2 A 0322 | MR3 A 032B | MR31 A 033E | MR33 A 0343 | MR35 A 0346 |
| MR4 A 0359 | MR5 A 036C | MRUN A 0308 | MSET A 02B5 | MSET1 A 02BD | MSGOK A 0535 | MSTAT A 0000 |
| MSTLNG A 000B | MTOFF A 0005 | MULT A 064B | NAVAIL A 0006 | NOACT A 0000 | NOERR A 0000 | NULMSG A 07D1 |
| NXTST A 7028 | NXTTIM A 7029 | OFFTIM A 04B1 | OFWAIT A 03DE | ONTLT A 0001 | OOSCNT A 0008 | OUTBUF A 704A |
| OUTCHR A 016A | OUTST A 01AB | OUTST1 A 0040 | OUTST2 A 0080 | OUTST3 A 0001 | OUTW1 A 018D | OUTW2 A 019B |
| OUTWT A 0188 | PARAM1 A 02C6 | PARAM2 A 02DC | PARAM3 A 02E2 | PERFE A 000A | PORIO A 0070 | PORIA A 0071 |
| PORTB A 0072 | PORTC A 0073 | PORTD A 0074 | PORTE A 0075 | PORTRS A 0010 | RAM1 A 0031 | RAM4 A 0046 |
| RAMBAD A 0142 | RAMEND A 70FF | RAMERR A 0001 | RAMPTR A 7025 | RAMST A 7000 | RDELAY A 03C0 | RDIAG A 0651 |
| READ2 A 0123 | READIN A 0114 | RESET A 0584 | REVTIM A 2000 | ROMC10 A 014E | ROMCHK A 0147 | ROMERR A 0041 |
| ROUTIN A 03C6 | RSBUF A 702C | RSDATA A 1000 | RSERR1 A 0040 | RSERR2 A 0080 | RSERR3 A 00C0 | SBIT A 7023 |
| SETERR A 0510 | SETFUL A 0763 | SJAM A 0001 | SLTDK A 0004 | SN7407 A FFFF | SNSERR A 062F | SNSTST A 04E4 |
| SOUT A 0004 | SS1BIT A 0001 | SS2BIT A 0002 | SS3BIT A 0004 | STO A 01E1 | STOFNC A 0000 | ST1 A 021B |
| ST1FNC A 0001 | ST2FNC A 0002 | STABL A 03D4 | STAK A 70FF | STALL A 0708 | STAT A 01BB | STCN0 A 027A |
| STCN1 A 0289 | STCN2 A 0293 | STCNT A 026B | STFD A 0005 | STOFD A 0003 | STRTER A 0631 | STS0 A 0246 |
| STS1 A 025B | STSEND A 0244 | STSTAT A 04EC | STX A 0002 | TENAB A 702B | TEST A 0710 | TEST0 A 0740 |
| TEST1 A 0751 | TESTBT A 0040 | TIMOT A 0001 | TIMOUT A 03B2 | TRUE A FFFF | TSTCOD A 00C1 | TSTERR A 079B |
| TSTMSG A 07D5 | VLG0 A 0604 | VLG1 A 0605 | VLG2 A 0613 | VLGET A 05C0 | WAIT A 01A1 | ZSF A 063B |

ASSEMBLY COMPLETE, NO ERRORS.

What is claimed is:

1. Apparatus for dispensing a stamp comprising:
   a. means for receiving stamp dispensing data, said data being arranged in serial data messages of predetermined format, said serial data messages selectively including data representative of a quantity of stamps to be dispensed;
   b. stamp transport means for selectively transporting a plurality of sequentially connected stamps;
   c. means for converting received stamp dispensing data into actuating signals for actuating said stamp transport means;
   d. said apparatus having a dispensing aperture such that in response to said dispensing data a quantity of stamps of said plurality of sequentially connected stamps corresponding to said data representative of quantity is transported from an undispensed position to a dispensed position through said dispensing aperture;
   e. means for counting the number of stamps dispensed; and
   f. said means for counting including an LED and phototransister combination disposed for generating a pulse upon the passage of perforations of the sequentially connected stamps between the LED and phototransistor.

2. The apparatus of claim 1 wherein said means for receiving stamp dispensing data comprises a universal-synchronous asynchronous receiver transmitter.

3. The apparatus of claim 1 further comprising means for providing position data of said stamp transport means for detection of jams.

4. The apparatus of claim 1 further comprising diagnostic test means for testing the means for receiving stamp dispensing data and said stamp transport means and for displaying the results as flashing indicators.

5. The apparatus of claim 4 wherein the flashing indicators also serve as out-of-stamp indicators.

6. Apparatus for dispensing a stamp comprising:
   a. a frame
   b. means mounted on said frame for rotatably receiving a roll of sequentially connected stamps thereon;
   c. stamp transport means for guidingly receiving and transporting stamps from the roll to a stamp dispensing aperture on said frame;
   d. said stamp transport means including a feed roller operative for engaging stamps fed from the roll;
   e. said stamp transport means also comprising a motor operative for rotatingly driving the feed roller for transporting the stamps;
   f. means for receiving serial data in message of predetermined format from a sender, said serial data selectively including data representative of the number of stamps to be dispensed;
   g. computer means operative for decoding said serial data and for providing signals for actuating said motor for dispensing said number of stamps through said stamp dispensing aperture in response to the decoded serial data; and
   h. an LED photodetector fixture operative to pass the stamps fed from said roll between the LED and detector thereof for providing an electrical pulse output upon passage of light from said LED through perforations between stamps to said detector whereby the dispensing of stamps from said roll may be counted.

7. Apparatus for dispensing a stamp comprising:
   a. means for selectively transporting a plurality of sequentially-connected stamps;
   b. means for receiving stamp dispensing data, said data being arranged in a message of predetermined format, said data including data representation of the number of stamps to be dispensed;

c. means for actuating said means for selectively transporting in response to stamp dispensing data received by said means for receiving wherein the number of stamps to be dispensed of the plurality of sequentially-connected stamps is transported from an undispensed position to a dispensed position;

d. means for counting the number of stamps dispensed; and e. said means for counting including an LED and phototransister combination disposed for generating a pulse upon the passage of perforations of the sequentially connected stamps between the LED and phototransistor.

8. The apparatus of claim 7 wherein said data message is a serial data message.

9. The apparatus of claim 7 further comprising sensing means for sensing the transport of the plurality of stamps.

10. The apparatus of claim 7 wherein said means for selectively transporting includes a motor for driving a Geneva star wheel drivingly connected to a feed roller having projections therein for engaging perforations between stamps, said motor being operable upon actuation by said means for actuating.

11. A method for dispensing a stamp comprising the steps of:

a. receiving and storing a transmitted serial data message, said serial data message selectively including data corresponding to quantities of stamps to be dispensed;

b. decoding said serial data message to obtain the quantity of stamps to be dispensed;

c. generating a signal responsive to the number of stamps to be dispensed, said signal being operative to actuate a stamp transporting means to dispense the quantity of stamps through a dispensing aperture;

d. counting the number of stamps dispensed by counting pulses from means for counting including an LED and phototransister combination disposed for generating a pulse upon the passage of perforations of the sequentially connected stamps between the LED and phototransistor.

* * * * *